United States Patent
Yokoi et al.

(10) Patent No.: US 7,512,050 B2
(45) Date of Patent: Mar. 31, 2009

(54) INFORMATION RECORDING METHOD, INFORMATION RECORDING DEVICE, AND RECORDING MEDIUM CONTAINING A PROGRAM, WITH RECORDING MARKS FORMED BY EMITTING LIGHT

(75) Inventors: Kenya Yokoi, Kanagawa (JP); Naruhiro Masui, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 439 days.

(21) Appl. No.: 10/541,591

(22) PCT Filed: Oct. 15, 2004

(86) PCT No.: PCT/JP2004/015283

§ 371 (c)(1),
(2), (4) Date: Nov. 22, 2005

(87) PCT Pub. No.: WO2005/048247

PCT Pub. Date: May 26, 2005

(65) Prior Publication Data

US 2006/0245336 A1     Nov. 2, 2006

(30) Foreign Application Priority Data

Nov. 14, 2003   (JP) ............................. 2003-384827

(51) Int. Cl.
*G11B 7/0045* (2006.01)
(52) U.S. Cl. ................ 369/59.12; 369/59.11; 369/47.53
(58) Field of Classification Search ............. 369/59.12, 369/59.11, 47.53
See application file for complete search history.

(56) References Cited

U.S. PATENT DOCUMENTS

| | | | | |
|---|---|---|---|---|
| 5,590,111 | A | * | 12/1996 | Kirino et al. ............. 369/47.53 |
| 5,732,062 | A | | 3/1998 | Yokoi et al. |
| 6,526,013 | B1 | * | 2/2003 | Narumi et al. ........... 369/47.53 |
| 7,075,871 | B2 | * | 7/2006 | Kato et al. ............... 369/47.53 |
| 2001/0053115 | A1 | | 12/2001 | Nobukuni et al. |
| 2003/0035355 | A1 | * | 2/2003 | Morishima ............... 369/47.53 |

FOREIGN PATENT DOCUMENTS

| | | |
|---|---|---|
| EP | 1 130 583 A1 | 9/2001 |
| EP | 1 361 570 A2 | 11/2003 |
| JP | 09-134525 | 5/1997 |
| JP | 2000 036115 A | 2/2000 |
| JP | 2000-182244 | 6/2000 |
| JP | 2001-331936 | 11/2001 |
| JP | 2002-269744 | 9/2002 |
| JP | 2004-213865 | 7/2004 |

OTHER PUBLICATIONS

Supplementary European Search Report dated Jan. 8, 2009.

* cited by examiner

*Primary Examiner*—Wayne R Young
*Assistant Examiner*—LaTanya Bibbins
(74) *Attorney, Agent, or Firm*—Dickstein Shapiro LLP

(57) ABSTRACT

A first trial write process obtains an optimum recording power of a test pattern even with respect to data having different rules for the recording waveforms corresponding n type data length sets, and a second trial write process using this optimum recording power obtains optimum pulse width or optimum pulse edge position separately for each data length set. Based on the optimum recording power and optimum recording waveform obtained by these trial write processes, recording operation is performed so as to form all the data lengths with satisfactory accuracy, thereby making it possible to obtain a proper reproduced signal.

13 Claims, 12 Drawing Sheets

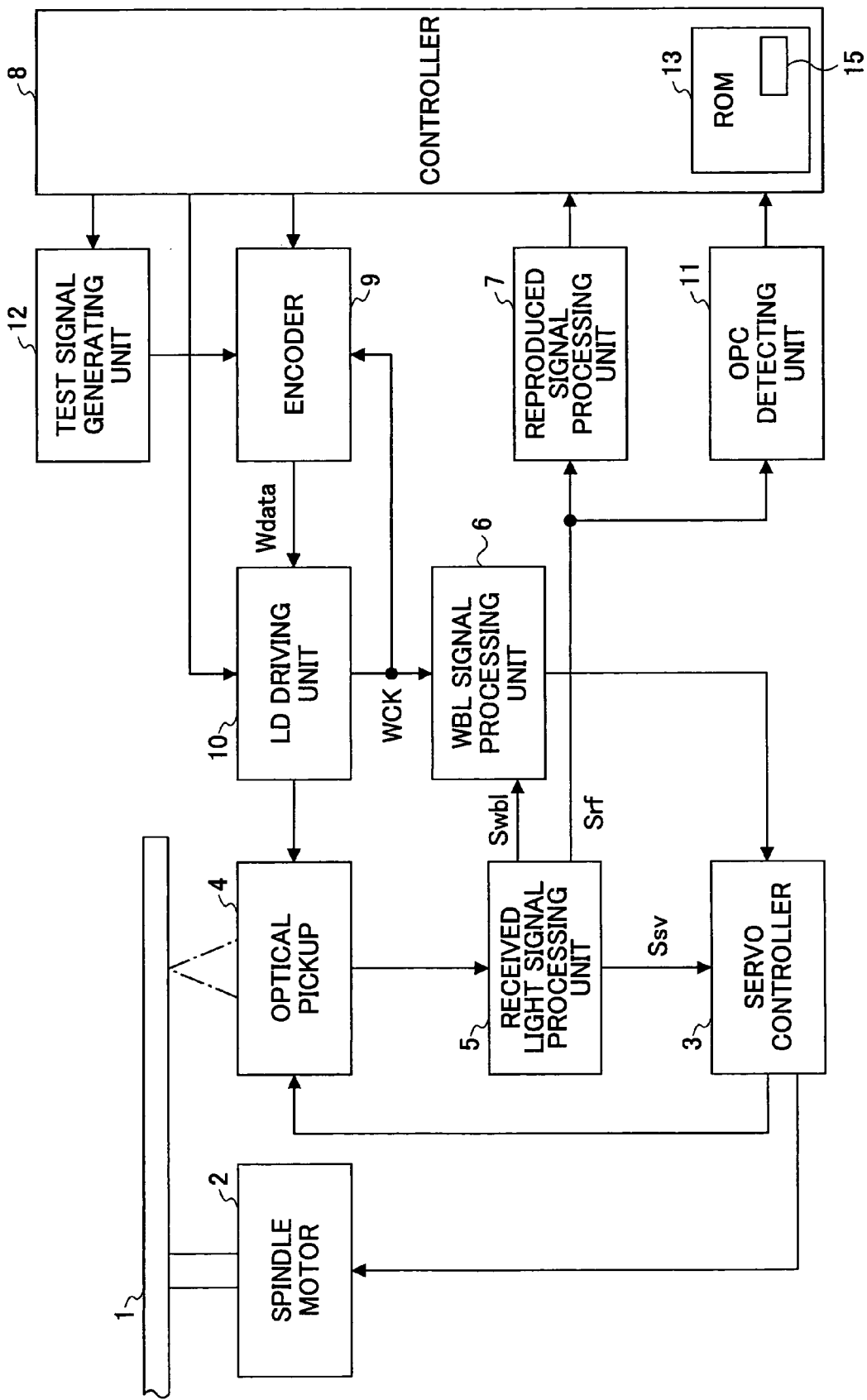

INFORMATION RECORDING METHOD, INFORMATION RECORDING DEVICE, AND RECORDING MEDIUM CONTAINING A PROGRAM, WITH RECORDING MARKS FORMED BY EMITTING LIGHT

FIELD OF THE INVENTION

The present invention relates to an information recording method, information recording apparatus, and record medium having a program embodied therein for use with respect to various recording media such as CD-R, CD-RW, DVD-R, DVD-RW, DVD-RAM, and DVD+RW.

BACKGROUND TECHNOLOGY

In recent years, recordable optical disk drive apparatuses such as CD-R drive apparatus have been put into practical use, and further study has been made with the aim of achieving further increase in the storage capacity and recording speed. Recordable optical disk media includes write-once optical disks using dye media, rewritable disks using magneto-optical media, phase-change media, or the like.

Typical optical disk recording apparatus uses a semiconductor laser as a light source, and emits on a record medium the laser light that is pulse-modulated in response to record information, thereby forming record marks. In doing so, the state of the formed record mark changes in response to the power of the recording laser light, so that there is a need to know a recording power that is suitable to the characteristics of the recording medium. To this end, conventionally, trial write is performed with respect to a predetermined area (PCA: power calibration area) as preparation for the start of recording while the recording power is changed. After the trial write, the area that produces the reproduced signal having the most satisfactory quality is identified, and the power that was used to record this area is identified as the optimum recording power. This method is known as an OPC (optimum power contol) method. During the actual recording of data, the optimum recording power identified in this manner is maintained while recording.

As a recording method used for optical disks such as CD and DVD, a mark edge recording method is employed in which the length of marks suitable for high-density recording carries information. In order to reproduce data correctly, there is a need for accurate control of mark shape and edge position. Further, for the purpose of organizing the mark shape evenly regardless of the length of the marks, a multi-pulse recording method is widely used that forms recording marks by use of pulse trains that are divided into a plurality of recording pulses. This method forms a long mark evenly by forming and connecting marks through the repetition of heating and cooling cycles. Such method is also employed in the write-once dye-type media.

DISCLOSURE OF THE INVENTION

[Problem to be Solved by the Invention]

In response to the recent demand for faster recording, various recording methods have been proposed, one of which is to lower the frequency of recording waveforms. When the frequency of a reference clock signal increases with an increase in the recording speed, for example, the time length of heating and cooling of the multi-pulse recording becomes extremely short. The limit to the rising time and falling time of the LD light emission waveform thus causes the light emission pulses to be less sharp, resulting in a sufficient heating time and cooling time failing to be secured. A recording failure thus occurs. In consideration of this, instead of increasing the number of multi-pulses with each clock cycle in accordance with the data length, a pair of a heating pulse and a cooling pulse may be increased on a two-clock-cycle basis. This is 2T strategy method, which is generalized as an nT strategy method by which a pair of a heating pulse and a cooling pulse is increased on an n-clock-cycle basis (n is an integer that is 2 or larger). These methods have been put into practical use.

The relationship between the nT strategy method and the recording pulse waveform is as follows. A deviation $\Delta$ from the ideal value of a recording mark length with respect to a recording power Pw shifts from one data length set to another data length set as the data lengths are classified by the remainder of the division of each data length by an integer n. Because of this, pulse width and pulse edge position are selected separately for each data length set. A recommended value is computed based on the results of evaluation obtained by use of a tester in advance.

FIG. 11(a) illustrates an example of a histogram of each mark data length with respect to a satisfactorily reproduced signal. The configuration of the recording pulses is based on the 2T strategy. An average of each data length set (3, 5, 7, 9, 11T) that corresponds to the remainder "1" of the division by n=2, i.e., having an odd-number length, and an average of each data length set (4, 6, 8, 10, 14T) that corresponds to the remainder "0" of the division by n=2, i.e., having an even-number length, need to be distributed at equal intervals. In the case of DVD-type disks, the mark length is 3T to 14T (T is the cycle of the data reference clock), but 14T is omitted in FIG. 11. Here, an average of each data length set having an even-number data length may have a deviation $\pm\Delta$ from the ideal value when the optimum recording power is used. Namely, when the rules of recording waveforms differ between the odd-number-length data length set and the even-number-length data length set, a difference from the odd-number-length data length set may develop, depending on whether each pulse width and pulse edge position match the recording power. As a result, only when the optimum recording power identified by the trial write is optimally combined with each pulse width and pulse edge position of the even-number-length data length set and the odd-number-length data length set, the mark length becomes the ideal length as shown in FIG. 11(a).

In an example shown in FIG. 11(b), the recording power may be small, or the pulse width and pulse edge position may be shifted such that an average length of an even-number-length data length set becomes shorter than the ideal length. In an example shown in FIG. 11(c), the recording power may be large, or the pulse width and pulse edge position may be shifted such that an average length of an even-number-length data length set becomes longer than the ideal length.

As described above, in the 2T strategy recording method for conventional high-speed recording, or more generally, in the nT strategy recording method that uses a recording pulse train, the trial write (OPC) is performed to compute an optimum recording power. In so doing, the optimum recording power is obtained by performing the trial write with changes in the recording power while maintaining constant pulse width and pulse edge position regardless of the recording power.

In such OPC method as described above, however, the relationship between the recording power and the deviation from the data-length-specific ideal value depends on the conditions of rapid cooling by the arrangement of heating pulses and cooling pulses, and, thus, varies between the even-number-length data length set and the odd-number-length data length set. When a different optimum recording power is computed from the combination of the preset recording power and the pulse width and pulse edge position preset in the pre-format information of the disk, a deviation of the mark length from the above-noted ideal value increases. More specifically, if there is variation in the record medium and/or the recording apparatus (i.e., variation of the recording pulse waveform due to the variation of the LD driving unit), the relationship between the optimum recording power Po (optimum) and the pulse width and pulse edge position of the recording pulses also varies. Because of this, the precision of mark shape and mark position is undermined to degrade performance, which gives rise to a problem by serving as a factor to cause data error.

It is an object of the present invention to achieve accurate recording by obtaining optimum pulse width and pulse edge position in a recording method that performs recording according to the rules of recording waveform using different pulse widths and pulse edge positions for individual data length sets with respect to the data length sets having the different relationship between the number of multi-pulses constituting a recording pulse train and the data length.

Further, there is a need to set the pulse width and pulse edge position separately for each data length set because the relationship between the nT strategy method and the recording pulse waveform is such that the relationship between the deviation $\Delta$ from the ideal value of a recording mark length and the recording power Pw shifts from one data length set to another data length set as the data lengths are classified by the remainder of the division of each data length by an integer n.

Another object of the present invention is to achieve proper recording by use of an optimum recording power computed from trial write such that the mark length of each even-number-length data length set and each odd-number-length data length set becomes the ideal length.

[Means for Solving the Problem]

The invention of claim 1 is an information recording method of recording information by forming recording marks by emitting light, from a light source on a record medium, modulated according to record information and rules by use of n (n: integer more than one) type data length sets which are classified by a data length of record information such that the rules of recording waveforms thereof are different, including a first trial write step of writing as a trial a predetermined first test pattern in a trial write area of the record medium while changing a recording power for emitting in a stepwise manner, so as to obtain an optimum recording power from a reproduced signal of recorded trial write data, and a second trial write step of performing trial write in the trial write area of the record medium by use of the optimum recording power by using a second test pattern corresponding to each of the data length sets while changing pulse width or pulse edge position of recording waveform for each of the data length sets in a stepwise manner, and obtaining an optimum pulse width or optimum pulse edge position of the recording waveform corresponding to each of the data length sets from a reproduced signal of each recorded second test pattern, wherein information is recorded based on the optimum recording power obtained in said first trial write step and the optimum pulse width or optimum pulse edge position obtained in the second trial write step.

The invention of claim 2 is the information recording method as claimed in claim 1, wherein said first trial write step includes a first test pattern generating step of generating the first test pattern for performing trial write in the trial write area of the record medium, and an optimum recording power obtaining step of obtaining the optimum recording power from the reproduced signal of the recorded trial write data, and wherein said second trial write step includes a second test pattern generating step of generating the second test pattern corresponding to each of the data length sets for performing of trial write, a trial write processing step of performing trial write in the trial write area of the record medium by using the optimum recording power and the second test pattern while maintaining fixed pulse width and fixed pulse edge position of recording waveform for one or more particular data length sets and while changing pulse width or pulse edge position of recording waveform for other data length sets in a stepwise manner, and an optimum recording waveform obtaining step of obtaining the optimum pulse width or optimum pulse edge position of recording waveform corresponding to the data length sets from the reproduced signal of the second test pattern corresponding to said other data length sets by using a reference asymmetry value derived from a reproduced signal of recorded trial write data corresponding to the second test pattern corresponding to said one or more particular data length sets.

The invention of claim 3 is the information recording method as claimed in claim 1 or 2, wherein the first test pattern is a data series including all data lengths, and wherein the second test pattern has a predetermined data length, and is a data series that constitutes the n type data length sets.

The invention of claim 4 is the information recording method as claimed in claim 1 or 3, wherein the optimum recording power in said first trial write step is obtained from a modulation factor of the reproduced signal of the area in which trial write is performed in said step, or obtained from a rate of change in the modulation factor, and wherein the optimum pulse width or optimum pulse edge position corresponding to each of the data length sets in said second trial write step is obtained from an asymmetry that is a ratio of a positive-side peak value to a negative-side peak value relative to an average value level of the reproduced signal of the area in which trial write is performed in said step.

The invention of claim 5 is the information recording method as claimed in claim 2 or 3, wherein the optimum recording power in said first trial write step is obtained such that a modulation factor, or a rate of change in the modulation factor, of the reproduced signal of the area in which trial write is performed in said step becomes a desired value, and wherein the optimum pulse width or optimum pulse edge position corresponding to each of said other data length sets in said second trial write step is obtained such that an asymmetry of the reproduced signal of the area in which trial write is performed in said step substantially coincides with a value of an asymmetry corresponding to said one or more particular data length sets.

The invention of claim 6 is the information recording method as claimed in claim 5, wherein the optimum pulse width or optimum pulse edge position corresponding to each of the data length sets in said second trial write step is obtained from an average value of the reproduced signal corresponding to each of the n type data length sets in the area in which trial write is performed in said step.

The invention of claim 7 is an information recording method of recording information by forming recording marks by emitting light, from a light source on a record medium, modulated according to record information and rules by use of n (n: integer more than one) type data length sets which are classified by a data length of record information such that the rules of recording waveforms thereof are different, including a trial write step, provided separately for each of the data length sets, of performing trial write in a trial write area of the record medium by use of the optimum recording power by using a test pattern corresponding to each of the data length sets while changing pulse width or pulse edge position of recording waveform for each of the data length sets in a stepwise manner, and obtaining an optimum pulse width or optimum pulse edge position of the recording waveform corresponding to each of the data length sets from a reproduced signal of each recorded second test pattern, wherein information is recorded based on the optimum pulse width or optimum pulse edge position obtained in each trial write step.

The invention of claim 8 is the information recording method as claimed in any one of claims 1 through 7, wherein the data length sets are classified according to a remainder of division of the data length of the record information by the integer n, and the data length sets have, as a data length corresponding to a clock cycle T of the record information, a rule by which a pair of a heating pulse and a cooling pulse is added for each nT multi-pulses constituting the record waveform of the n type data length sets.

The invention of claim 9 is the information recording method as claimed in claim 2 or 5, wherein the integer n is 2, and a pair of a heating pulse and a cooling pulse is added for every 2T multi-pulses constituting the record waveform of each of the data length sets, and wherein the data length sets having odd-number-length data lengths with respect to a clock cycle T of the record information are used as said particular data length sets.

The invention of claim 10 is an information recording apparatus for recording information by forming recording marks by emitting light, from a light source on a record medium, modulated according to record information and rules by use of n (n: integer more than one) type data length sets which are classified by a data length of record information such that the rules of recording waveforms thereof are different, including a first trial write unit to write as a trial a predetermined first test pattern in a trial write area of the record medium while changing a recording power for emitting in a stepwise manner, so as to obtain an optimum recording power from a reproduced signal of recorded trial write data, and a second trial write unit to perform trial write in the trial write area of the record medium by use of the optimum recording power by using a second test pattern corresponding to each of the data length sets while changing pulse width or pulse edge position of recording waveform for each of the data length sets in a stepwise manner, and obtaining an optimum pulse width or optimum pulse edge position of the recording waveform corresponding to each of the data length sets from a reproduced signal of each recorded second test pattern, wherein information is recorded based on the optimum recording power obtained by said first trial write unit and the optimum pulse width or optimum pulse edge position obtained by the second trial write unit.

The invention of claim 11 is the information recording apparatus as claimed in claim 10, wherein said first trial write unit includes a first test pattern generating unit to generate the first test pattern for performing trial write in the trial write area of the record medium, and an optimum recording power obtaining unit to obtain the optimum recording power from the reproduced signal of the recorded trial write data, and wherein said second trial write unit includes a second test pattern generating unit to generate the second test pattern corresponding to each of the data length sets for performing of trial write, a trial write processing unit to perform trial write in the trial write area of the record medium by using the optimum recording power and the second test pattern while maintaining fixed pulse width and fixed pulse edge position of recording waveform for one or more particular data length sets and while changing pulse width or pulse edge position of recording waveform for other data length sets in a stepwise manner, and an optimum recording waveform obtaining unit to obtain the optimum pulse width or optimum pulse edge position of recording waveform corresponding to the data length sets from the reproduced signal of the second test pattern corresponding to said other data length sets by using a reference asymmetry value derived from a reproduced signal of recorded trial write data corresponding to the second test pattern corresponding to said one or more particular data length sets.

The invention of claim 12 is the information recording apparatus as claimed in claim 10 or 11, wherein the first test pattern is a data series including all data lengths, and wherein the second test pattern has a predetermined data length, and is a data series that constitutes the n type data length sets.

The invention of claim 13 is the information recording method as claimed in claim 10 or 12, wherein the optimum recording power in said first trial write unit is obtained from a modulation factor of the reproduced signal of the area in which trial write is performed in said unit, or obtained from a rate of change in the modulation factor, and wherein the optimum pulse width or optimum pulse edge position corresponding to each of the data length sets in said second trial write unit is obtained from an asymmetry that is a ratio of a positive-side peak value to a negative-side peak value relative to an average value level of the reproduced signal of the area in which trial write is performed in said unit.

The invention of claim 14 is the information recording apparatus as claimed in claim 11 or 12, wherein the optimum recording power in said first trial write unit is obtained such that a modulation factor, or a rate of change in the modulation factor, of the reproduced signal of the area in which trial write is performed in said unit becomes a desired value, and wherein the optimum pulse width or optimum pulse edge position corresponding to each of said other data length sets in said second trial write unit is obtained such that an asymmetry of the reproduced signal of the area in which trial write is performed in said unit substantially coincides with a value of an asymmetry corresponding to said one or more particular data length sets.

The invention of claim 15 is the information recording apparatus as claimed in apparatus 14, wherein the optimum pulse width or optimum pulse edge position corresponding to each of the data length sets in said second trial write unit is obtained from an average value of the reproduced signal corresponding to each of the n type data length sets in the area in which trial write is performed in said unit.

The invention of claim 16 is an information recording apparatus for recording information by forming recording marks by emitting light, from a light source on a record medium, modulated according to record information and rules by use of n (n: integer more than one) type data length sets which are classified by a data length of record information such that the rules of recording waveforms thereof are different, including a trial write unit, provided separately for each of the data length sets, to perform trial write in a trial write area of the record medium by use of the optimum recording power by using a test pattern corresponding to each of the data length sets while changing pulse width or pulse edge position of recording waveform for each of the data length sets in a stepwise manner, and to obtain an optimum pulse width or optimum pulse edge position of the recording waveform corresponding to each of the data length sets from a reproduced signal of each recorded second test pattern, wherein information is recorded based on the optimum pulse width or optimum pulse edge position obtained by each trial write unit.

The invention of claim 17 is the information recording apparatus as claimed in any one of claims 10 through 16, wherein the data length sets are classified according to a remainder of division of the data length of the record information by the integer n, and the data length sets have, as a data length corresponding to a clock cycle T of the record information, a rule by which a pair of a heating pulse and a cooling pulse is added for each nT multi-pulses constituting the record waveform of the n type data length sets.

The invention of claim 18 is the information recording apparatus as claimed in claim 11 or 14, wherein the integer n is 2, and a pair of a heating pulse and a cooling pulse is added for every 2T multi-pulses constituting the record waveform of each of the data length sets, and wherein the data length sets having odd-number-length data lengths with respect to a clock cycle T of the record information are used as said particular data length sets.

The invention of claim 19 is a record medium having an information recording program recorded therein for causing a controller to record information by forming recording marks by emitting light, from a light source on a record medium, modulated according to record information and rules by use of n (n: integer more than one) type data length sets which are classified by a data length of record information such that the rules of recording waveforms thereof are different, said information recording program causing said controller to perform a first trial write step of writing as a trial a predetermined first test pattern in a trial write area of the record medium while changing a recording power for emitting in a stepwise manner, so as to obtain an optimum recording power from a reproduced signal of recorded trial write data, and a second trial write step of performing trial write in the trial write area of the record medium by use of the optimum recording power by using a second test pattern corresponding to each of the data length sets while changing pulse width or pulse edge position of recording waveform for each of the data length sets in a stepwise manner, and obtaining an optimum pulse width or optimum pulse edge position of the recording waveform corresponding to each of the data length sets from a reproduced signal of each recorded second test pattern, wherein said controller is caused by said information recording program to record information based on the optimum recording power obtained in said first trial write step and the optimum pulse width or optimum pulse edge position obtained in the second trial write step.

The invention of claim 20 is the record medium having the information recording program recorded therein as claimed in claim 19, wherein said first trial write step of said information recording program causes said controller to perform a first test pattern generating step of generating the first test pattern for performing trial write in the trial write area of the record medium, and an optimum recording power obtaining step of obtaining the optimum recording power from the reproduced signal of the recorded trial write data, and wherein said second trial write step of said information recording program causes said controller to perform, a second test pattern generating step of generating the second test pattern corresponding to each of the data length sets for performing of trial write, a trial write processing step of performing trial write in the trial write area of the record medium by using the optimum recording power and the second test pattern while maintaining fixed pulse width and fixed pulse edge position of recording waveform for one or more particular data length sets and while changing pulse width or pulse edge position of recording waveform for other data length sets in a stepwise manner, and an optimum recording waveform obtaining step of obtaining the optimum pulse width or optimum pulse edge position of recording waveform corresponding to the data length sets from the reproduced signal of the second test pattern corresponding to said other data length sets by using a reference asymmetry value derived from a reproduced signal of recorded trial write data corresponding to the second test pattern corresponding to said one or more particular data sets.

[Advantage of the Invention]

According to the invention claimed in claim 1, 2, 10, 11, 19, or 20, an optimum recording power of a test pattern is obtained even with respect to data having rules for the recording waveforms corresponding n type data length sets, and the trial write using this optimum recording power obtains optimum pulse width or optimum pulse edge position separately for each data length set. Based on the optimum power and recording waveform, therefore, recording operation is performed so as to form all the data lengths with satisfactory accuracy, thereby producing a proper reproduced signal.

According to the invention claimed in claim 3 or 12, the second test pattern is a data series constituting a plurality of data length sets, so that it is possible to achieve the trial write that matches the recording waveform corresponding to each data length set. Since there is no error in the detected values of the reproduced signal, optimum pulse width or pulse edge position can be obtained accurately.

According to the invention claimed in claim 4 or 13, the first trial write process can produce the optimum recording power easily with satisfactory precision. Further, a difference in the data length of each data length set can be easily detected with satisfactory precision. It is thus possible to perform proper recording that is superior in terms of matching between the recording power and the pulse width or pulse edge position.

According to the invention claimed in claims 5 through 7 and 14 through 16, with respect to the n type data length sets and each test pattern, a trial write process is performed separately for each data length set so as to obtain the pulse width or pulse edge position of each optimum recording waveform such as to allow a detected value of a separate reproduced signal to be obtained. It is thus possible to perform proper recording that is superior in terms of matching between the recording power and the pulse width or pulse edge position.

According to the invention claimed in claims 8, 9, 17, and 18, the method that uses recording waveforms having the number of multi-pulses reduced, as is often referred to as the nT strategy, which is used in the high-speed recording of a phase-change-type disk, and the so-called 2T strategy that is adoptable to the high-speed recording of CD or DVD, make it possible to achieve proper recording on such recording medium without creating a disparity in the recording pulse width or pulse edge position and the optimum recording power between the odd-number-length data length sets and the even-number-length data length sets.

[Advantage of the Invention]

According to the present invention, it is possible to achieve accurate recording by obtaining each optimum pulse width and pulse edge position in a recording method that performs recording according to the rules of recording waveform using different pulse widths and pulse edge positions for individual data length sets with respect to the data length sets having different relationship between the number of multi-pulses constituting a recording pulse train and the data length.

Further, according to the present invention, it is possible to achieve proper recording by use of an optimum recording power computed from trial write such that the mark length of each even-number-length data length set and each odd-number-length data length set becomes the ideal length.

BRIEF DESCRIPTION OF THE DRAWINGS

FIG. 1A is a block diagram showing an example of the outline configuration of an optical information recording apparatus according to an embodiment of the present invention.

DESCRIPTION OF SYMBOLS

Figure 1B:
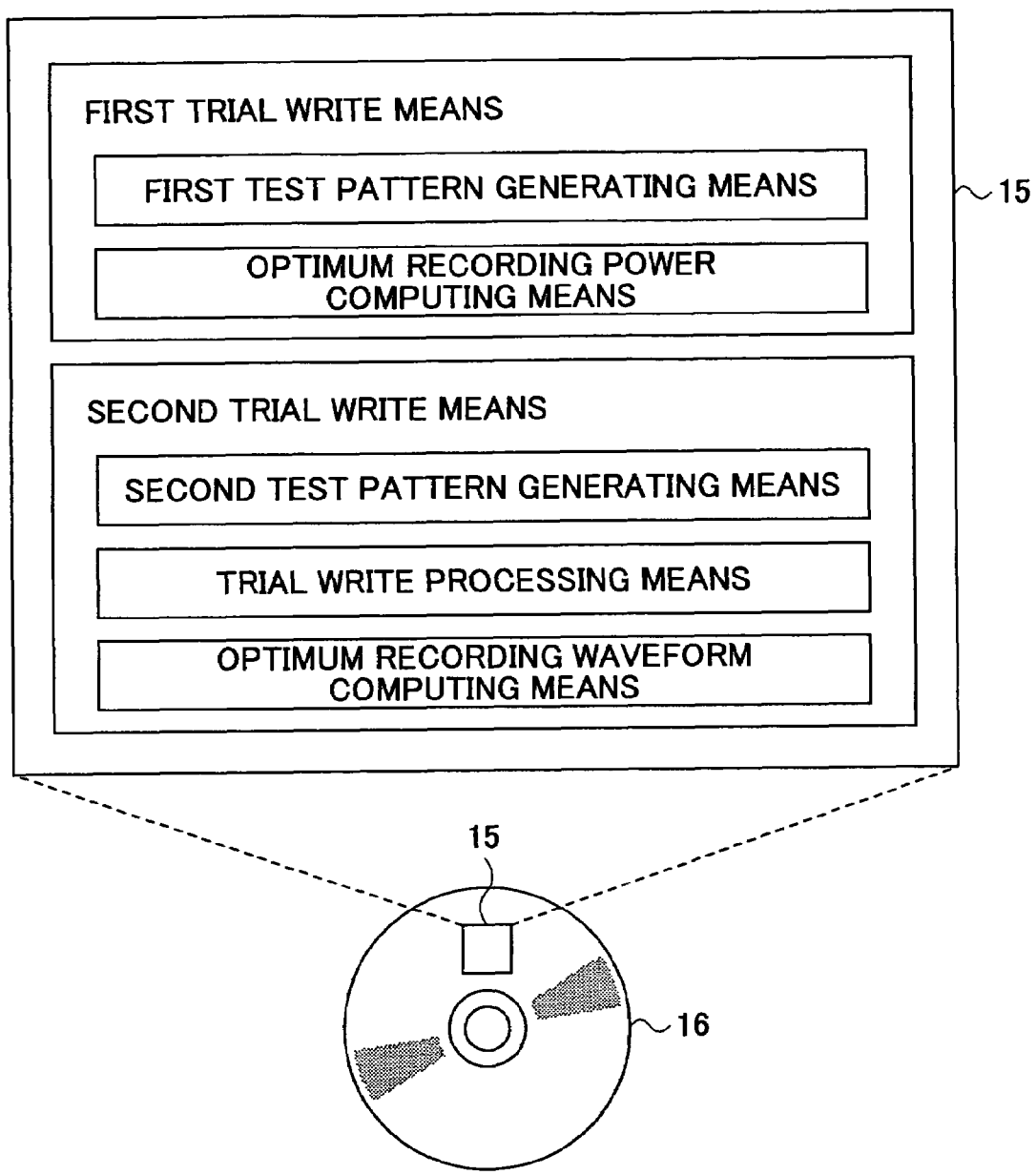
FIG. 1B is an outline functional block diagram of an information recording program stored in a record medium.

1 Record Medium
2 Trial Write Area

BEST MODE FOR CARRYING OUT THE INVENTION

An embodiment of the present invention will be described with reference to the accompanying drawings. An information recording apparatus of this embodiment is an example of application to an optical information recording apparatus. FIG. 1A is a block diagram showing an example of the outline configuration of such optical information recording apparatus.

A record medium 1 used in this optical information recording apparatus is a recordable record medium (e.g., optical disks such as CD-R, CD-RW, DVD-R, DVD-RW, DVD+R, DVD+RW, DVD-RAM, MD, and MO). A spindle motor 2 for revolving the record medium 1 is controlled to achieve a constant linear velocity (CLV) or a constant angular velocity (CAV) according to the signals supplied from a servo controller 3. An optical pickup (PU) 4 shines the light emitted from a semiconductor laser (LD) on the record medium 1 to perform information writing, or receives reflective light returning from the record medium 1 for conversion into a received-light signal. The optical pickup 4 includes the light source, a light receiving device for receiving the reflective light for conversion into the received-light signal, an optical system, an actuator, and so on. The optical pickup 4 is further provided with a monitor light receiving unit for monitoring a portion of the light emitted from the light source. The output monitor signal is used to control the variation of the intensity of the light emitted from the light source. Further, a tilt detecting light receiving unit may be provided in some cases for the purpose of detecting a tilt of the record medium 1 relative to the emitted light.

A received light signal processing unit 5 receives received-light signals from various light receiving units provided in the optical pickup 4, an performs various signal processing. A reproduced signal Srf is obtained from the received-light signal. Together with the servo controller 3, an actuator is driven and controlled (focus-servo control and track-servo control) such that the light is always shone within a predetermined error range against variation such as surface wobbles associated with the rotation of the record medium 1 and the deviation of the track in the radial direction. To this end, a servo-error signal Ssv is generated from the received-light signal, and is supplied to the servo controller 3. The optical pickup 4 is movable in the radial direction of the record medium 1, and performs a seek operation such as to emit the light spot at a desired position. The servo controller 3 also serves to perform the seek control, the rotation control of the record medium 1, the tilt control, etc., according to the address information and the like prerecorded on the record medium 1.

A wobble of a record track winding at predetermined frequency is formed in advance on the record medium 1. The received light signal processing unit 5 also generates a wobble signal Swbl made by extracting the wobble component. Based on the wobble signal Swbl, a wobble signal processing unit 6 performs rotation control, detection of address information, generation of a recording clock WCK serving as a reference clock at the time of recording.

A reproduced signal processing unit 7 demodulates the reproduced signal Srf according to the predetermined modulation scheme rules of the record medium 1 that is being reproduced. Further, the reproduced signal processing unit 7 extracts a reproduced clock by use of a built-in PLL circuit. The demodulated data is supplied to a controller 8.

An encoder 9 modulates record information supplied from the controller 8 according to the predetermined modulation scheme rules, thereby to generate record data. In so doing, the generation of the record data is based on the recording clock WCK serving as a reference. In DVD recording apparatus, for example, the EFM+ modulation method is employed, and the pulse length of record data Wdata is 3T to 11T, and 14T (T is the cycle of the recording clock WCK).

An LD driving unit 10 modulates the light source LD with a predetermined light waveform according to the record data Wdata and the recording clock WCK. The emitting power and light waveform information are set by the controller 8. Further, a monitor received-light signal is supplied from the received light signal processing unit 5. Based on the monitor received-light signal, control (so-called APC (automatic power control)) is performed such that the amount of the light emitted from the light source LD becomes a desired value.

The controller 8 executes a firmware program (F/W program) stored in a flash ROM 13 to perform an information recording/reproducing method according to the present invention, and performs the function of each means of the optical information recording apparatus according to the present invention.

The flash ROM 13 is a nonvolatile memory, which can be erased or rewritten by the controller 8. The flash ROM 13 stores therein programs for the overall control of the optical information recording apparatus and firmware programs comprised of an information recording program 15 for performing the steps of the information recording/reproducing method according to the present invention.

As shown in FIG. 1B, the information recording program 15 is configured such as to cause the controller 8 to perform a first trial write means and a second trial write means. The first trial write means includes a first test pattern generating means and an optimum recording power computing means, and the second trial write means includes a second test pattern generating means, a trial write processing means, and an optimum recording waveform computing means.

The information recording program 15 can be distributed by being stored in a record medium 16. The record medium 16 is a record medium that records information optically, electrically, or magnetically, and may be an optical disk such as CD or DVD, a memory card comprised of a flash memory, a flexible disk, a magneto-optical disk (MO), an IC memory, or the like. The record medium 16 can be anything as long as it can record information.

The record medium 16 is mounted on the optical information recording apparatus or in the memory card reader or the like of a main computer (so-called personal computer or DVD player) coupled to the optical information recording apparatus. The information recording program 15 is then installed into the flash ROM 13. The information recording program 15 may alternatively be downloaded and installed through a network.

Figure 2:
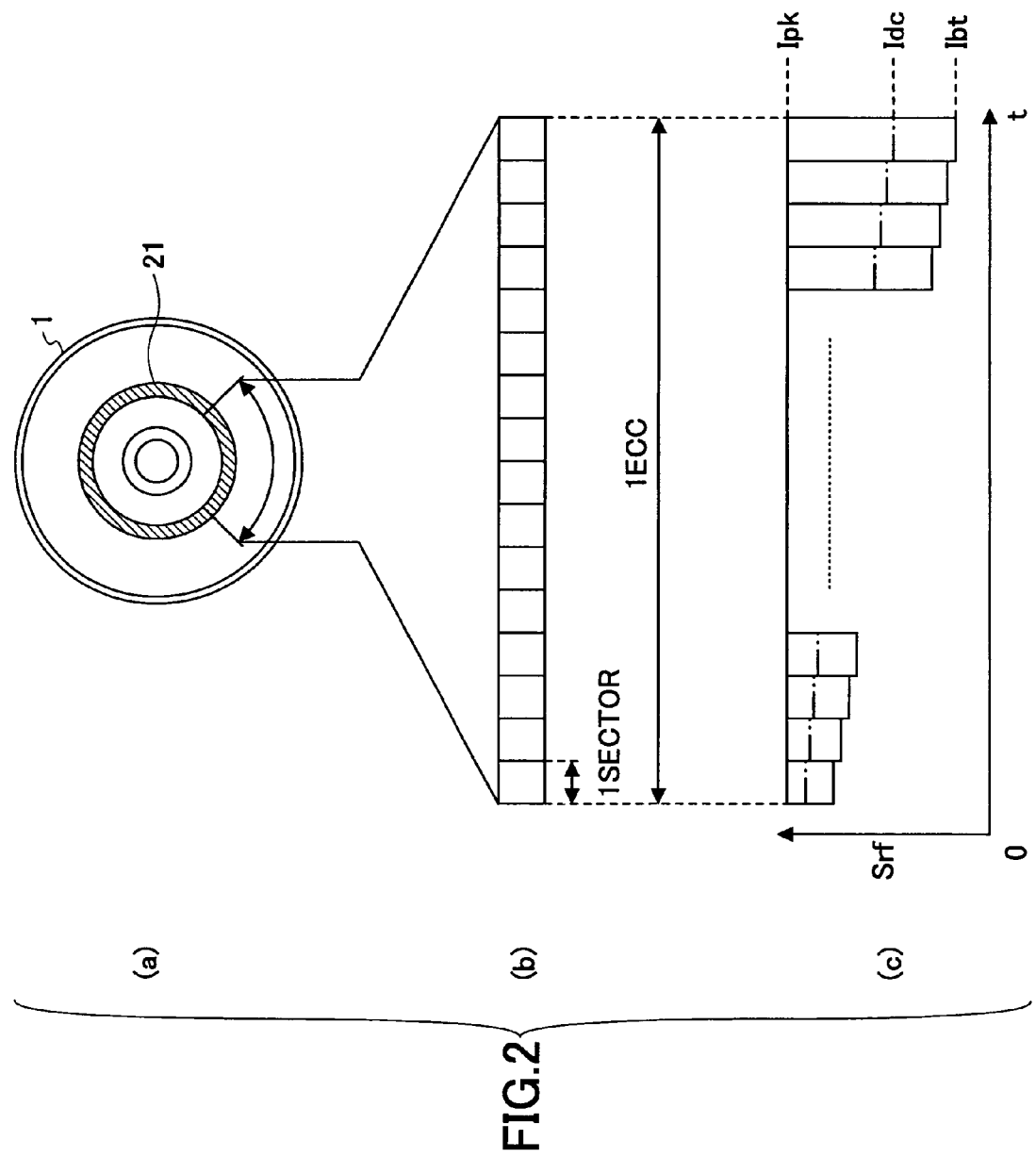
FIG. 2 is an illustrative drawing regarding a PCA area and a trial write method.

The record medium 1 has a PCA (power calibration area=trial write area) 21 in a predetermined region (e.g., the innermost portion) as shown in FIG. 2(a). Prior to the start of the intended recording, trial write is performed with respect to this area to obtain an optimum recording power. At the time of actual recording, OPC (optimum power control) is performed such that recording is carried out by use of the obtained optimum recording power. As shown in FIG. 2(b), further, a single trial write is performed by use of one ECC block (one ECC block includes 16 sectors) serving as a unit of information recording, for example, and the recording power is changed on a sector-by-sector basis.

Figure 3:
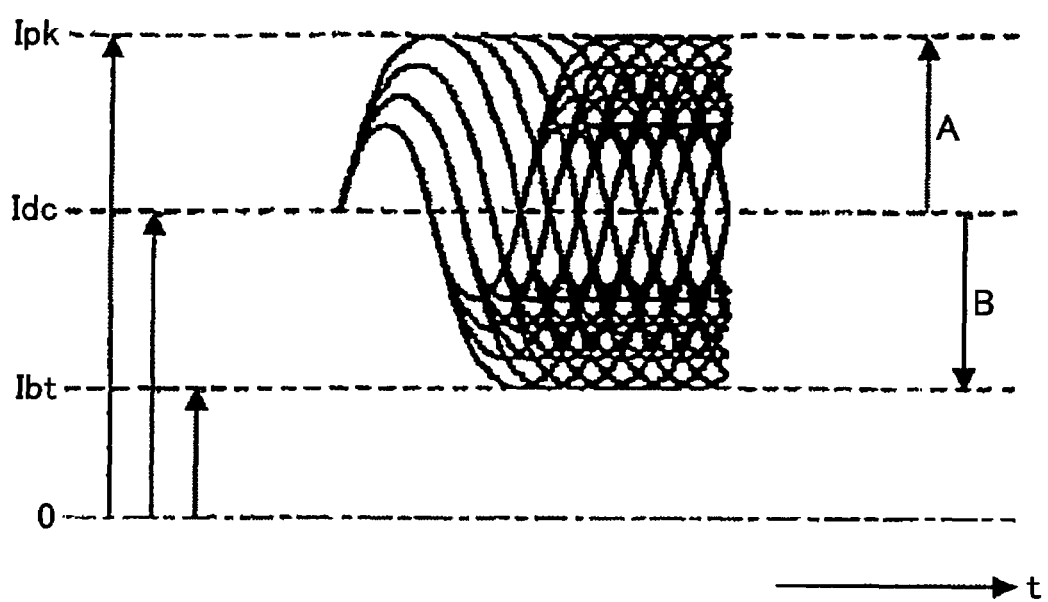
FIG. 3 is a drawing showing an I diagram of a reproduced signal.

Consequently, the reproduced signal Srf from the area in which the trial write is performed becomes as shown in FIG. 2(c). An OPC detecting unit 11 then detects a maximum value Ipk, a minimum value Ibt, and an average value (DC value) Idc with respect to each sector of the reproduced signals Srf. FIG. 3 is an example of the I diagram of the reproduces signal Srf. The controller 8 performs reproduction with respect to the area in which trial write is performed, and detects these values, followed by computing an optimum recording power from these values by performing a predetermined computation. This computation will later be described in detail.

A test signal generating unit 12 generates trial write data (test pattern) at the time of performing trial write. The trial write data is supplied to the encoder 9. At the time of trial write, this data is selectively output for provision to the LD driving unit 10.

The controller 8 performs the functions previously described, processing control as will be described, and the exchange of record/reproduced information and command communication with the host computer (not shown). In this manner, the overall control of the apparatus is achieved.

Figure 4:
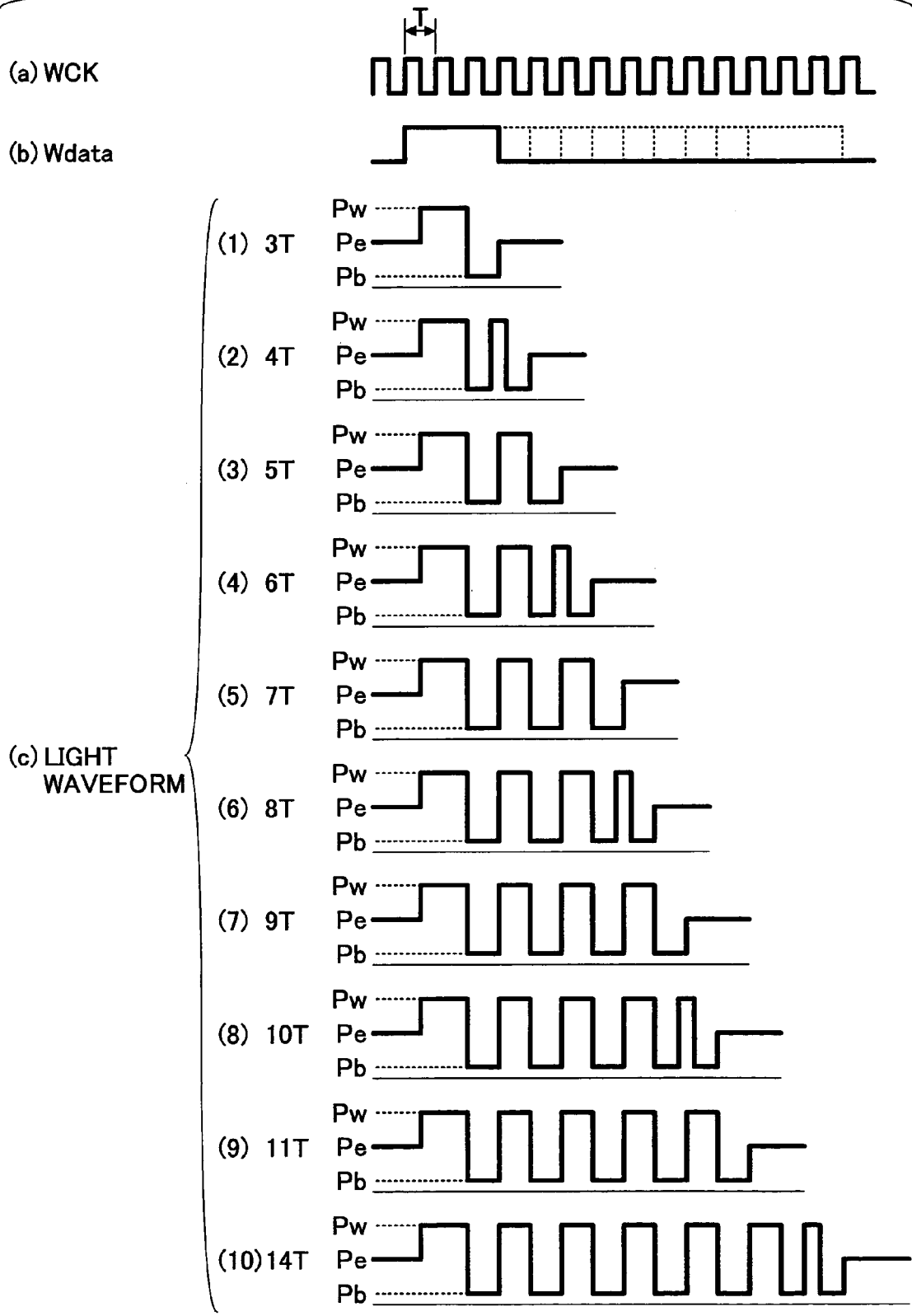
FIG. 4 is a waveform diagram showing an example of light emission recording waveform used in the 2T strategy with respect to each record information item.

FIG. 4 shows an example of the waveform of the light emitted from the light source LD when a phase-change-type record medium (rewritable record medium) such as a DVD-RW is used as the record medium 1. FIG. 4(a) illustrates the recording clock WCK, FIG. 4(b) illustrating the record data Wdata, and FIG. 4(c) illustrating the waveform of optical recording in the case of the data length of the record data Wdata being 3T(1) through 14T(10). The emitting power is set such that a bottom power is Pb, an erase power being Pe, and a write power being Pw.

When the frequency of the recording clock reaches a speed exceeding 100 MHz such as in the case of 24× write/read CD-RW or faster, 5× write/read DVD-RW or faster, or the like, the waveform of the emitted light shows less defined edges because the rise time and fall time of the light source LD are about 1.5 ns. The waveform of the emitted light is thus not a rectangular wave, failing to secure a sufficient heating time and cooling time. In consideration of this, the 2T strategy that uses the same number of pulses for 4T and 5T, for 6T and 7T, for 8T and 9T, and for 10T and 11T, respectively, is employed to achieve high-speed recording.

Figure 5:
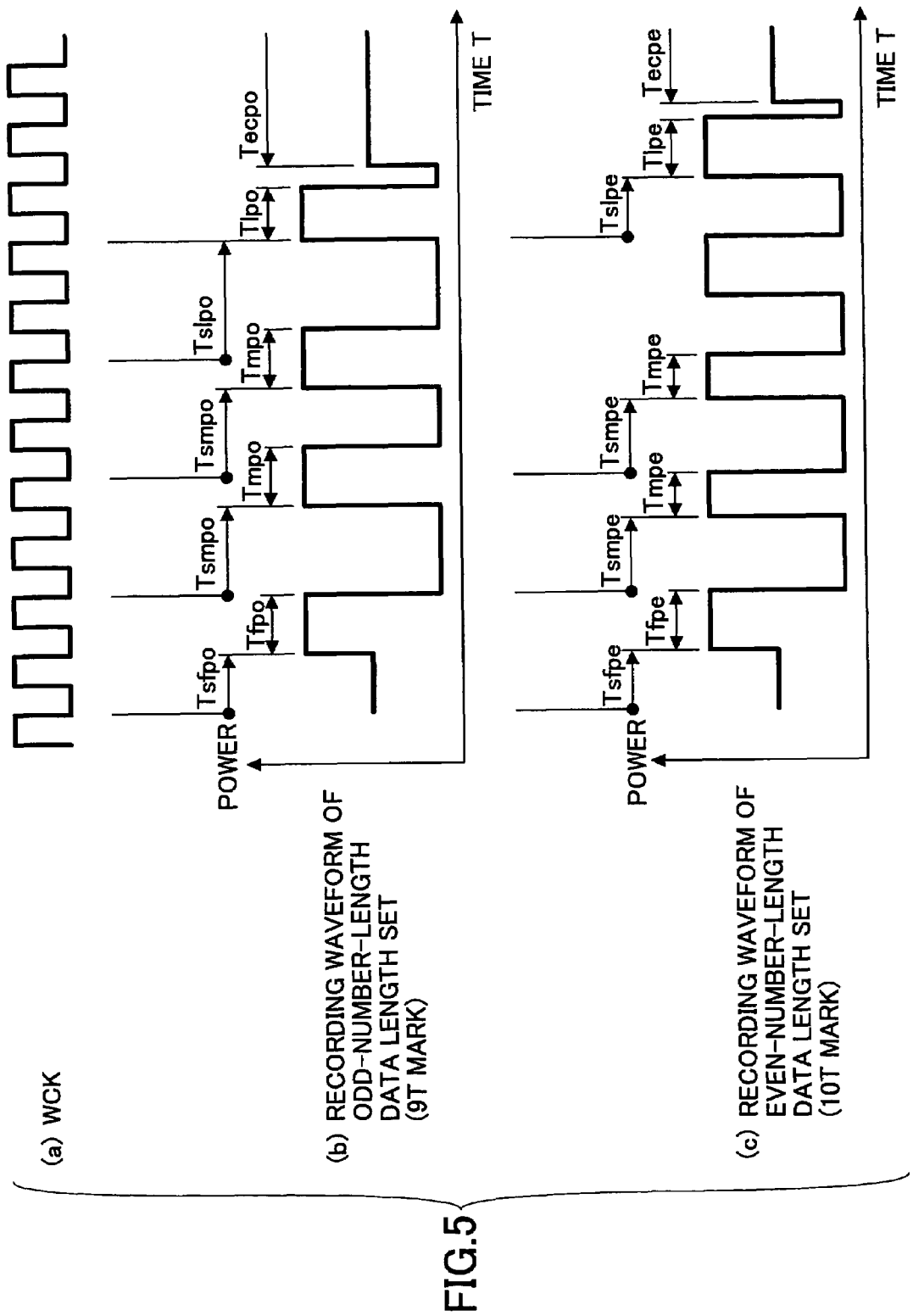
FIG. 5 is a waveform diagram showing an enlarged view of a selected portion thereof.

More specifically, the odd-number data length sets (3, 5, 7, 9, 11T) as shown in FIG. 5(b) and the even-number data length sets (4, 6, 8, 10, 14T) as shown in FIG. 5(c) have different rules for the pulse width and pulse edge position of recording waveforms. Here, an example of 9T and an example of 10T are shown. The leading edge positions Tsfpo and Tsfpe of the first heating pulse, the leading edge positions Tsmpo and Tsmpe of the first heating multi-pulse in the multi-pulse portion, and the leading edge positions Tslpo and Tslpe of the last heating pulse are set differently between the odd-number-length data length set and the even-number-length data length set ("e" at the end indicates an odd number, and "o" indicates an even number).

The width Tfp, Tmp, or Tlp of each heating pulse and the width Tecp of the last cooling pulse substantially coincide between the odd-number-length data length set and the even-number-length data length set. For the purpose of trial write as will be described, the pulse width Tlpo and Tlpe of the last heating pulse and the pulse width Tecpom and Tecpe of the last cooling pulse are settable to different widths.

Example of settings will be shown in the following.
Tsfpo=1.1T, Tsfpe=1.0T
Tsmpo=1.6T, Tsmpe=1.0T
Tslpo=2.1T, Tslpe=1.0T
Tecpo=Tecpe=0.2T
Tfpo=Tfpe=Tmpo=Tmpe=Tlpo=Tlpe=0.8T In general, the write power of each data length set is the same recording power Pw (=Pwo=Pwe) The predetermined pulse width and pulse edge position settings are determined based on combinations with the optimum recording power Po by the testing performed at the time of disk manufacturing.

The optical information recording apparatus has a different spot diameter and different light emission time due to variation of the optical system or variation of the LD driving unit 10. There is thus a deviation from the optimum recording power that is computed based on the trial write by the optical information recording apparatus. Because of this, if the initial settings of pulse width and pulse edge position of each odd-number-length data length set and even-number-length data length set are used without any change, a deviation (edge shift) occurs to deviate from the ideal length of the data length set with respect to the computed optimum recording power. In this embodiment, thus, an additional step is provided as a special feature to correct the settings of either one of the data length sets.

Figure 11:
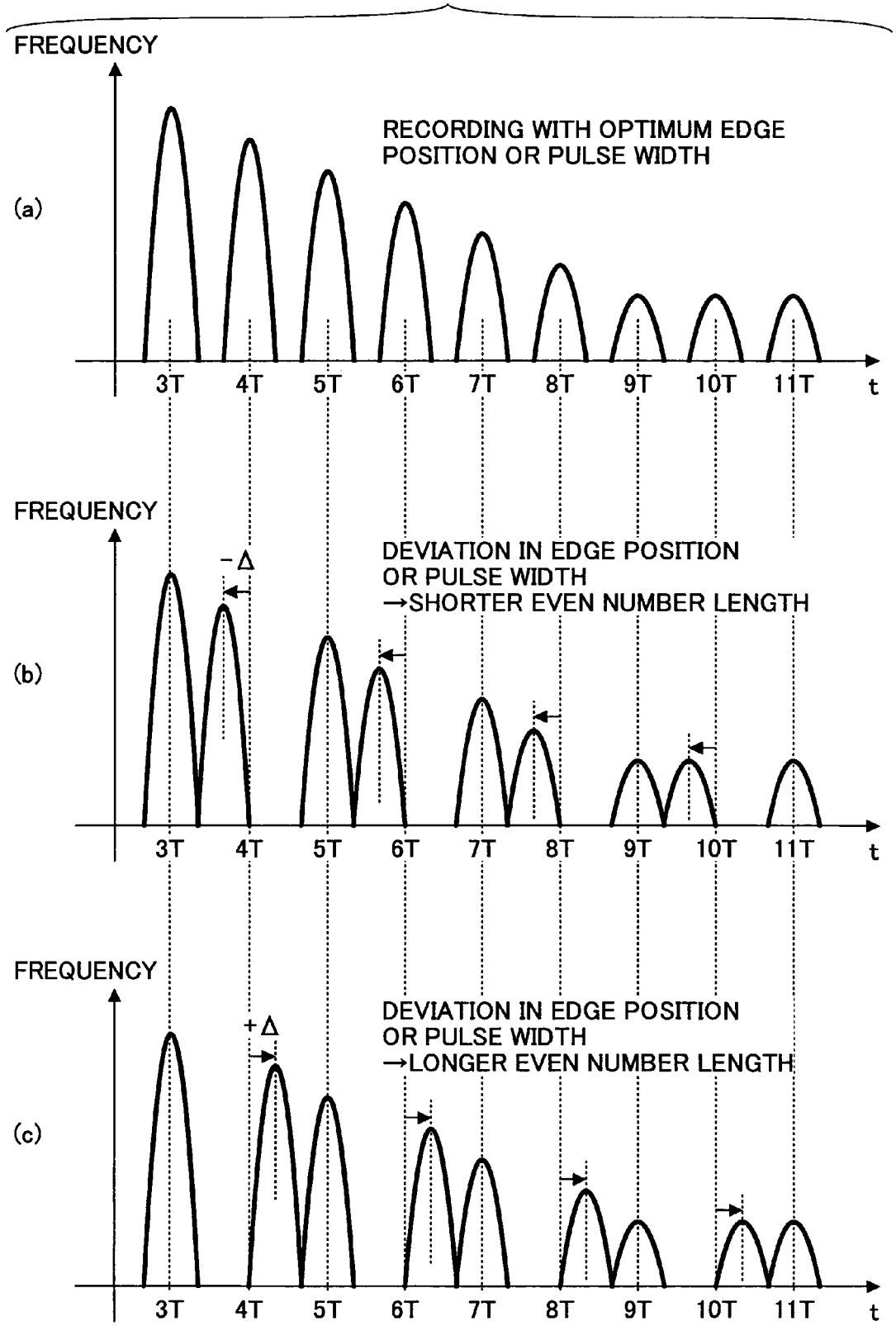
FIG. 11 is a drawing showing a histogram with respect to each mark data length of a reproduced signal.

In the trial write process of a special feature of the present embodiment as will later be described, according to the combinations between the record medium 1 and the information recording apparatus, there is a need to correct a deviation as shown in the histogram having a decreased average because of the shortened formation of an even-number-length data length as shown in FIG. 11(b) or as shown in the histogram having an increased average because of the lengthened formation of an even-number-length data length as shown in FIG. 11(b). To this end, the pulse edge position or pulse width of the recording waveform for creating an even-number-length mark is corrected as previously described. This makes it possible to form a mark as shown in FIG. 11(a) in which the odd-number-length data length and the even-number-length data length coincide with sufficient precision with the ideal lengths obtained by using the recording clock cycle T as a reference.

With reference to flowcharts of FIG. 7 and FIG. 8, a description will be given of an example of process control of the information recording method suitable to the record medium 1, which is performed by the controller 8 implemented by use of a microcomputer. FIG. 8 is a flowchart showing the finer details of the process example than FIG. 7. These will be described in parallel.

Figure 7:
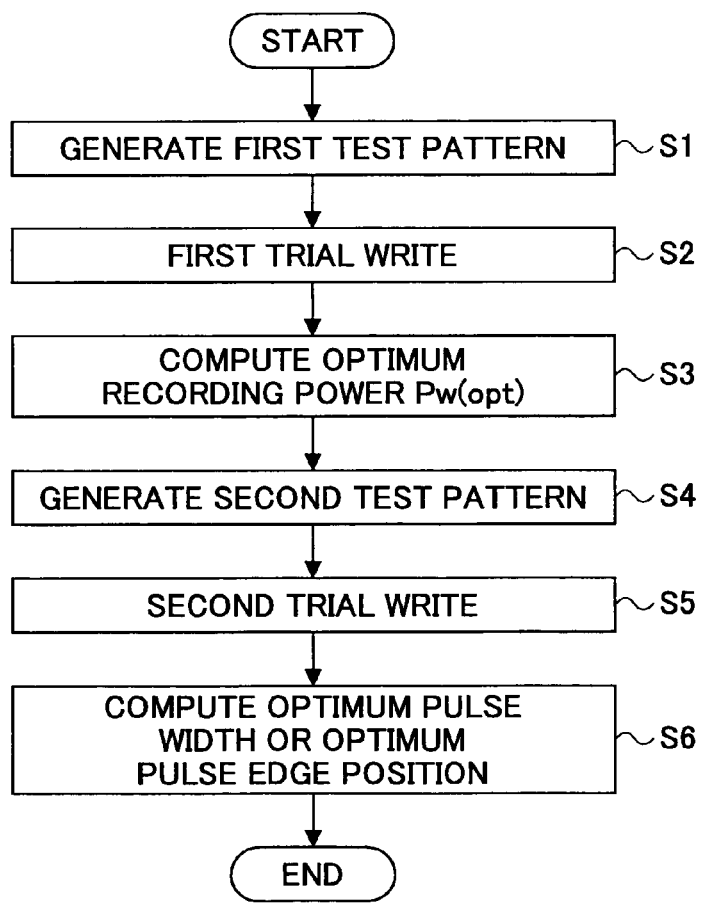
FIG. 7 is an outline flowchart showing an example of trial write process control.
Figure 8:
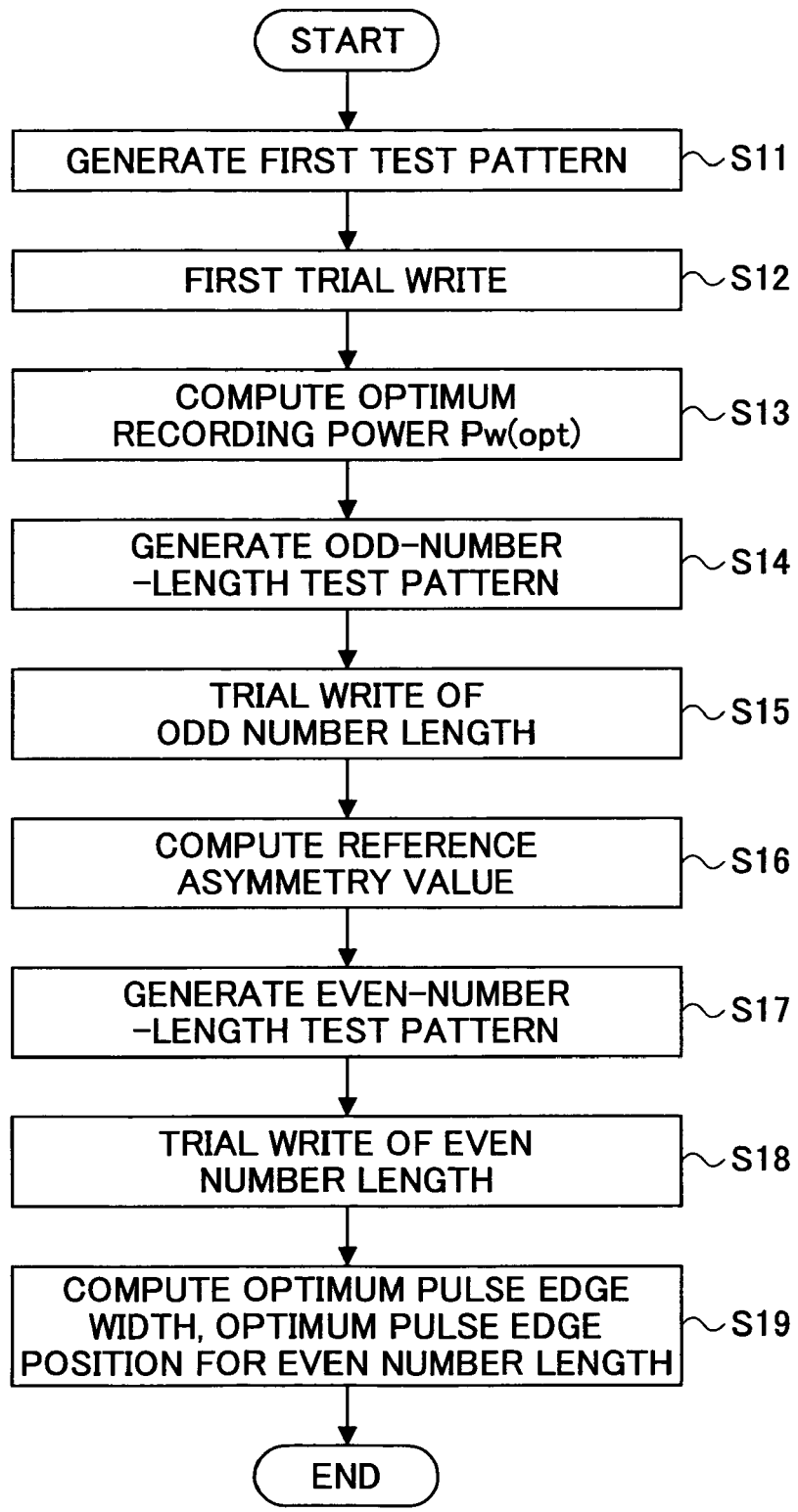
FIG. 8 is a flowchart showing further details.

FIG. 7 is a flowchart showing an algorithm for computing pulse width and pulse edge position with respect to each data length set and the optimum recording power Pw(opt). The computation of the optimum recording power is performed as a preparation prior to the start of recording information. Schematically, such computation includes a first trial write step and first trial write means of computing the optimum recording power Pw(opt), and a second trial write step and second trial write means of computing correction values for the pulse width or the pulse edge position based on the computed optimum recording power Pw(opt).

At step S1 (S11), a first test pattern to be used in the first trial write process is generated (first test pattern generating step, first test pattern generating means). The first test pattern is comprised of all data patterns, and is supposed to meet the predetermined modulation rules. In the first trial write process, the first test pattern is supplied from the encoder 9 as the record data Wdata.

At step S2 (S12), while the recording power Pw (Pw1, Pw2, Pw3, Pw4, ...) is changed by a predetermined step size on a sector-by-sector basis, the first test pattern is recorded in the predetermined trial write area of the record medium 1.

In step S3 (S13), the area in which the trial write is performed at step S2 is reproduced, and the power that is used to record the sector for which the reproduced signal Srf is most satisfactory is identified as the optimum recording power Pw(opt) Steps S2 and S3 (S12 and S13) are performed as the first test pattern generating process and the first test pattern generating means.

In order to evaluate the quality of the reproduced signal, an example as shown below may be used.

Firstly, the maximum value Ipk, the minimum value Ibt, and the average value (DC value) Idc of the reproduced signal Srf are detected with respect to each sector. Then, the computation:

$$\beta = [(Ipk-Idc)-(Idc-Ibt)]/(Ipk-Ibt) \quad (1)$$

is performed separately for each sector, thereby computing asymmetry β.

Typically, the most satisfactory reproduced signal is obtained when β=0, so that the power used for recording the sector closest to zero is properly identified as the optimum recording power Pw(opt). Alternatively, a formula approximating the recording power Pw and the asymmetry β may be derived, based on which the recording power corresponding to β=0 may be computed. Such computation is preferable in the case of a dye-type optical disk.

Secondly, a rate of change in the modulation factor of the reproduced signal with respect to the recording power may be used as an indication. In the same manner as previously described, the maximum value Ipk and the minimum value Ibt of the reproduced signal Srf are detected with respect to each sector. Then, the modulation factor m is computed as follows.

$$m = (Ipk-Ibt)/Ipk \quad (2)$$

Based on the computed modulation factor m and the recording power Pw used at that time, a rate of change γ in the modulation rate m with respect to the recording power is computed as:

$$\gamma = (dm/dPw)(Pw/m) \quad (3)$$

Then, the recording power Pt used when the rate of change γ becomes a predetermined value γt is obtained, and is multiplied by a predetermined coefficient k to generate the optimum recording power Pw. The predetermined value yt and the coefficient k are determined in advance separately for each type of record medium 1 and for each information recording apparatus.

A further detailed computing method will be described in the following. Based on a plurality of data sets indicative of the modulation factor m and the recording power Pw detected by reproducing the trial write area, a second-order approximation formula is obtained as:

$$m = a \cdot Pw^2 + b \cdot Pw + c \quad (4) \text{ (a, b, c: constants)}$$

As a method of approximation, a typical approximation method such as polynomial approximation may be used. An approximation formula higher than the second order properly matches the measured samples.

From the formula (3) previously described, dm/dPw=2a·Pw+b is obtained. As a result, a formula (5) as follows is obtained.

$$Pw = \{-b(\gamma-1) \pm SQRT[b^2(\gamma-1)^2 - 4a(\gamma-2)c\gamma]\}/2a(\gamma-2) \quad (5)$$

Based on these computations, a positive solution Pw+ of the equation (5) is computed to obtain the optimum recording power Pw(opt). Such computation is preferable for a phase-change-type optical disk.

These methods may be combined. Further, a jitter detecting unit may be provided such as to compute the recording power producing a minimum jitter.

The data length at this time includes all the data lengths, and the recording power deviated from the optimum recording power ends up forming a mark length that differs for each data length set. In the computation based on the rate of change γ in the modulation factor, however, the modulation factor is detected based on the relatively longer data lengths of each data length set. Accordingly, an edge shift and data-length deviation themselves are not reflected in the computed results. Namely, even if the computed optimum recording power includes an error due to variation of the information recording apparatus, it is impossible to detect whether the settings of the pulse width or pulse edge position used in the first trial write process have no displacement between the odd-number-length data length sets and the even-number-length data length sets.

In the present embodiment, in the recording by use of the optimum recording power, a mark edge shift and/or average data length deviation of each data length set are detected with respect to the data length sets for which recording pulse trains are generated according to different rules. Then, the pulse width or pulse edge position is adjusted to perform correction.

Figure 6:
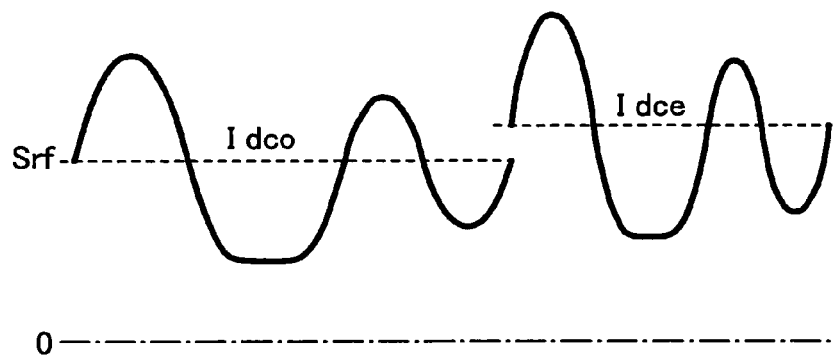
FIG. 6 is a drawing showing the way the average value characteristics of a reproduced signal differ depending on the data length set.

Further, the trial write may be performed by using the data patterns that include all the data lengths inclusive of odd-number lengths and even-number lengths. In such a case, the reproduced signal including an odd-number-length data length and the reproduced signal including an even-number-length data length may exhibit different values. If the pulse width and pulse edge position of a recording waveform for which the optimum recording power is selected in advance are used, the probability of exhibiting such different values is high, resulting in deviation in the asymmetry of the reproduced signal. By being different from another mark, the reproduced signal Srf from the area that is recorded by use of the optimum recording power of another mark may become as shown in FIG. 6. Namely, the average value Idco including an odd-number-length data length and the average value Idce including an even-number-length data length are different from each other. The detected average value Idc thus includes an error from the average value Idce including an even-number-length data length. As a result, an erroneous value is computed also for the asymmetry β, resulting in the erroneous computation of an optimum recording power. If the recording power and recording waveform are determined under this condition, the histogram of each data length as shown in FIG. 11(b) and FIG. 11(c) may be obtained. That is, the reproduced signal is such that the odd-number-length and even-number-length data length sets exhibit edge shifts, which causes degradation in the jitter characteristics, resulting in error in reproduction.

In the present invention embodiment, as shown in the second trial write which will be described in the following, a second data pattern for the trial write purpose is used in order to optimize the pulse width and pulse edge position with respect to each data length set conforming to the rules of recording waveform. As a result, the problem as described above does not arise, and it is thus possible to compute an optimum recording power and the pulse width or pulse edge position accurately.

In this method, it is possible to add the shortest data length likely to develop an edge shift as a separate data length set. A jitter detecting unit for computing an optimum value may be provided so as to compute the pulse width or edge position that achieves the smallest jitter.

The second trial write process having the features as described above is performed following the first trial write process for computing the optimum recording power. At step S4 (S14), the second test pattern for use in the second trial write process is generated (the second test pattern generating process and second test patter generating means). The second test pattern is based on the 2T strategy previously described, and is a data series that constitutes the data length sets (3, 5, 7, 9, 11T) having the residual "1" of the division by an integer n=2, i.e., an odd-number-length and the data length sets (4, 6, 8, 10, 14T) having the residual "0" of the division by n=2, i.e., an even-number-length.

In general, record data such as EFM+ (plus) modulated by the encoder 9 has a ratio of the generated quantity differing for each data length. In the case of RLL (run length limited code) code as in CD or DVD, generally, a ratio of generated quantity of n-type data patterns after random modulation is equal to $2^{n-1}$ successively from the shortest data length. In reality, the data prior to the modulation is assigned to a predetermined data pattern table, so that in the case of EFM+, 3T=32%, 4T=25%, 5T=17%, 6T=12%, 7T=7%, 8T=4%, 9T=2%, 10T=1%, 11T<1%, and 14T<1%. Because of this, an average value of the reproduced signal and the asymmetry caused by difference in the data length include errors if the ratio of generated quantities differs. Accordingly, the test patterns for the odd-number-length data length sets and even-number-length data length sets used in the second trial write process preferably have the ratio of generated data quantities as follows: 3T=55%, 5T=30%, 7T=10%, 9T=5%, 11T<1% for the odd-number-length data length sets and 4T=58%, 6T=28%, 8T=10%, 10T=3%, 14T<1% for the even-number-length data length sets. However, patterns that are properly adjusted such as to make an error ignorable in asymmetry detection are supplied from the controller as fixed data.

At step S5(S15), the recording power Pw is set to the recording power Pw(opt) computed at step S3, and the second test pattern including only the odd-number-length data length sets having the shortest mark length in the first sector are recorded. An average value and asymmetry value of the reproduced signal obtained from this sector are used as reference values (S16).

Then, the second test pattern including only the even-number-length data length sets on a sector-specific basis is used (S17) to bring about a large change in the pulse width Tfpe or a small change in the leading pulse edge position Tsfpo of the first heating pulse as previously described, and also to bring about a large change in the pulse width Tlpe or a large change in the leading pulse edge position Tslpe of the last heating pulse, thereby causing proper changes at predetermined intervals such as to make the even-number-length data length relatively long, while the second test patterns are being recorded in the trial write area (S18) (trial write processing process and trial write processing means). Namely, in the case of a phase-change-type disk comprised of a typical AgInSbTe-type record material, the leading edge position of the first heating pulse is shifted forward with respect to the recording clock, which makes it possible to form the leading edge (start position) of the recording mark such as to achieve a long mark length. At the same time, the leading edge position of the last heating pulse is shifted backward with respect to the recording clock, which makes it possible to form the trailing edge (end position) of the recording mark such as to achieve a long mark length.

In phase-change-type disks, the trial write area may overwrite the first trial write area of step S2. Alternatively, the second trial write may be performed after the erasure. Alternatively, the first trial write may be performed in the first half of the trial write area (e.g., 1 ECC block) that can be used in a lump, and the second trial write may be performed in the second half. In the case of a write-once disk comprised of a dye or inorganic material for which recording and writing can be performed only once, the position of pulse edge of recording waveform for controlling the mark length may have the start position thereof shifted forward or the end position thereof shifted backward, which is the same as in the case of the phase-change type.

Thereafter, at step S6(S19), the area in which the trial write is performed at step S5 is reproduced, and the second optimum recording pulse condition settings Tsfpe(opt), Tfpe(opt), Tslpe(opt), Tlpe(opt), and Tecpe(opt) are computed (optimum recording waveform computing process and optimum recording waveform computing means), which are the pulse edge position or pulse width that is used to record the sector for which the asymmetry β of the even-number-length reproduced signal Srf matches the asymmetry value of the odd-number-length reproduced signal serving as a reference value.

In order to evaluate the quality of a reproduced signal, similarly to the case of the first method of step S3, a maximum value Ipk, minimum value Ibt, and average value (DC value) Idc of the reproduced signal Srf are detected with respect to each sector, and the asymmetry β is computed by use of the formula (1). The settings of the recording pulse used to record the sector having the asymmetry β close to the odd-number-length reference asymmetry are computed as the optimum pulse settings (opt). Alternatively, a formula approximating the pulse edge position Tsfpe or pulse width Tfpe and the asymmetry β may be derived, based on which the recording power corresponding to β=reference asymmetry value may be computed. In the second trial write, the pulse edge position or pulse width of the even-number-length data lengths are matching by the recording power obtained in the first trial write. An odd-number-length average value Idco is the value corresponding to β=0. At step S5(S18), recording is performed while changing the pulse edge position or pulse width of the even-number-length recording pulse, so that an even-number-length average value Idce changes. Accordingly, the sector for which Idc3 becomes the value that satisfies Ipk−Idc3=Idc3−Ibt corresponds to the asymmetry β=0, and the pulse edge position or pulse width Tsfpe(opt), Tfpe(opt), Tslpe(opt), and Tlpe(opt) of the recording pulse used to record this sector are computed as optimum values (S19).

It should be noted that β=0 is not always the target value of the asymmetry β. The target value may be selected from the range −0.05<β<0.15 that is advantageous in terms of jitter characteristics and recording margins.

In the following, an example of the settings of the pulse edge and pulse width of a recording waveform used in the actual second trial write process will be shown.

Figure 9A:
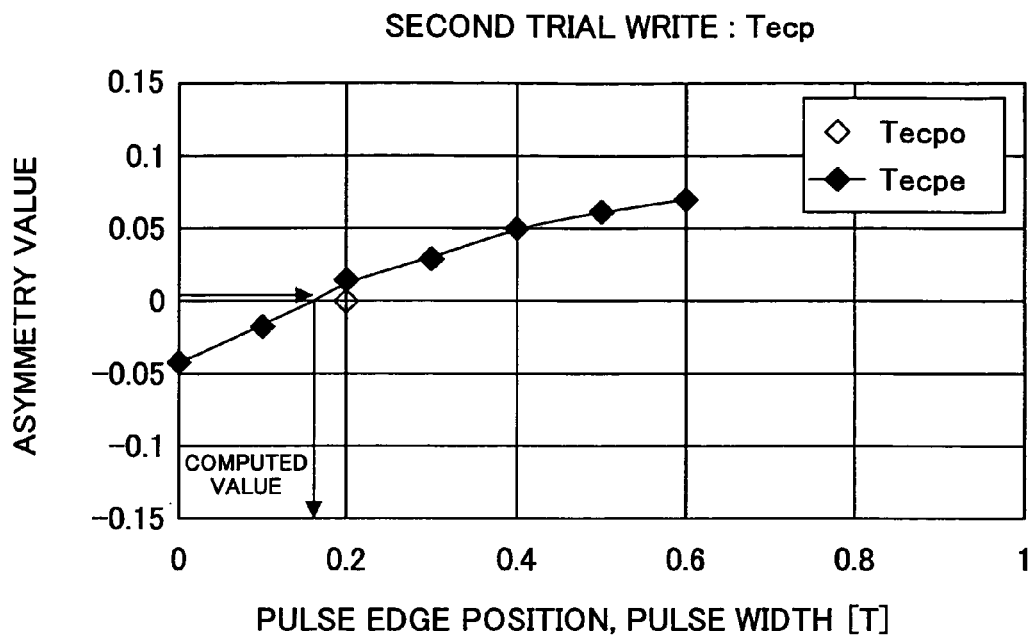
FIG. 9A is an illustrative drawing relating to various examples of settings of pulse edge position and pulse width.

In FIG. 9A, the pulse width Tecpe of the last cooling pulse is increased from 0T to 0.6T by increments of 0.1T with respect to the even-number-length data length sets, while the trial write is performed. When an asymmetry value detected from the reproduced signal coincides with the reference asymmetry value (=0) obtained from the odd-number-length data length sets, such an asymmetry value is identified. In this case, the pulse width Tecpe(opt)=0.15T of the last cooling pulse is obtained as an optimum value.

Figure 9B:
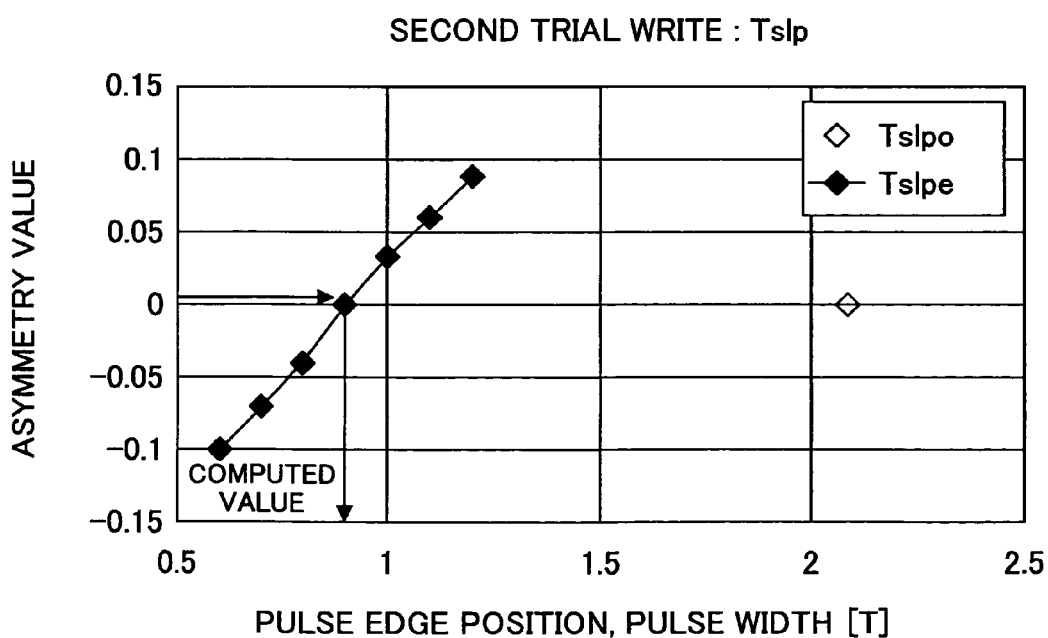
FIG. 9B is an illustrative drawing relating to various examples of settings of pulse edge position and pulse width.

In FIG. 9B, the leading edge position Tslpe of the last heating pulse is increased from 0.6T to 1.2T by increments of 0.1T with respect to the even-number-length data length sets, while the trial write is performed. When an asymmetry value detected from the reproduced signal coincides with the reference asymmetry value (=0) obtained from the odd-number-length data length sets, such an asymmetry value is identified. In this case, the leading edge position Tslpe(opt)=0.9T of the last heating pulse is obtained as an optimum value.

Figure 9C:
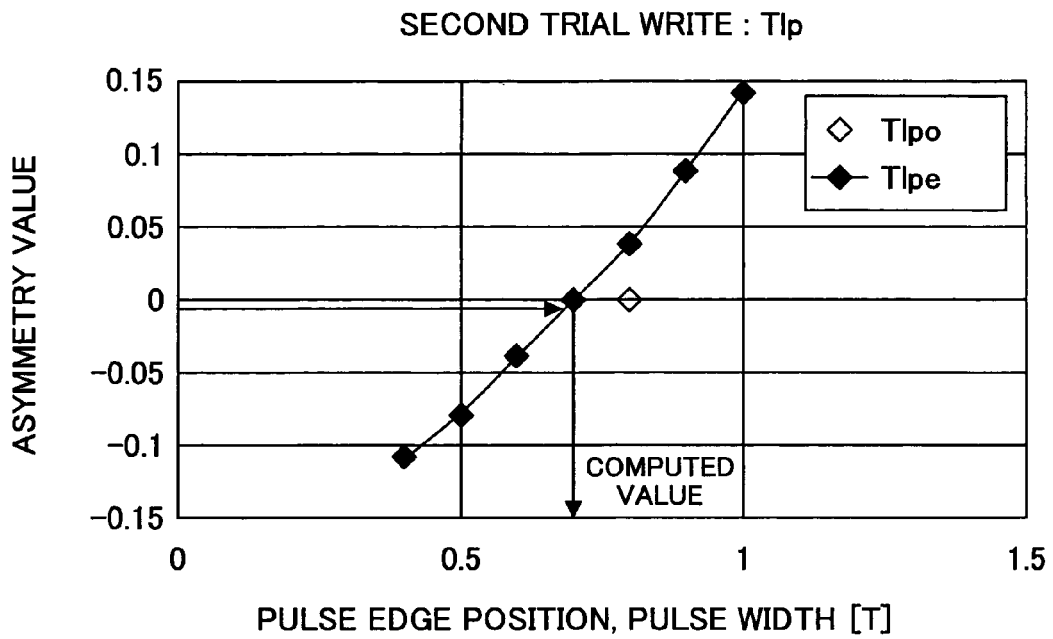
FIG. 9C is an illustrative drawing relating to various examples of settings of pulse edge position and pulse width.

In FIG. 9C, the pulse width Tlpe of the last heating pulse is increased from 0.4T to 1.0T by increments of 0.1T with respect to the even-number-length data length sets, while the trial write is performed. When an asymmetry value detected from the reproduced signal coincides with the reference asymmetry value (=0) obtained from the odd-number-length data length sets, such an asymmetry value is identified. In this case, the pulse width Tlpe(opt)=0.7T of the last heating pulse is obtained as an optimum value.

Figure 9D:
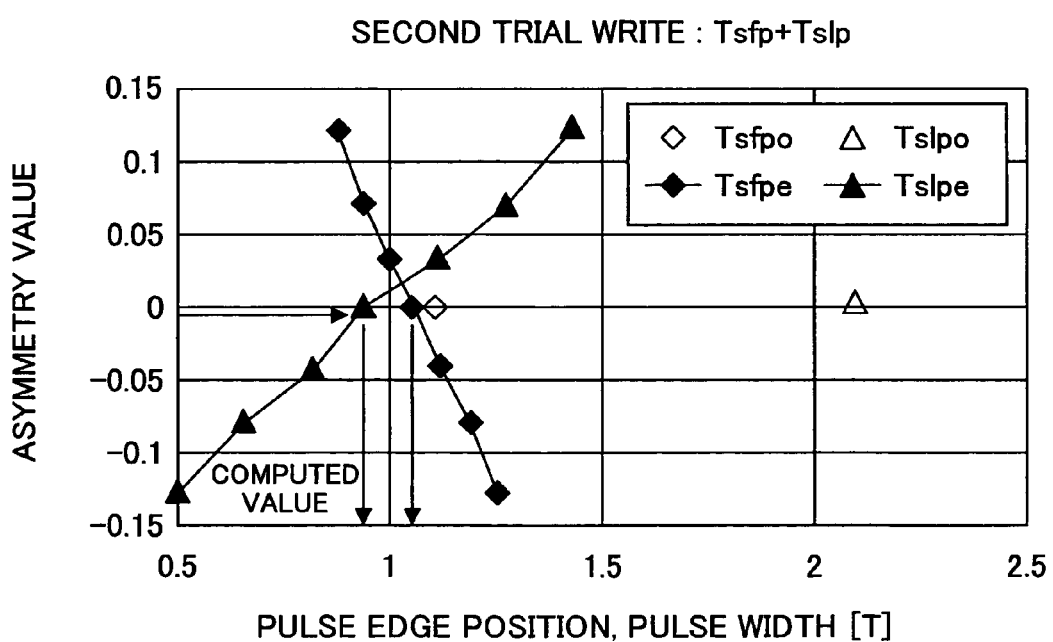
FIG. 9D is an illustrative drawing relating to various examples of settings of pulse edge position and pulse width.

In FIG. 9D, the leading edge position Tsfpe of the first heating pulse is decreased from 1.20T to 0.95T by steps of 0.05T with respect to the even-number-length data length sets, and, also, the leading edge position Tslpe of the last heating pulse is increased from 0.5T to 1.4T by steps of 0.15T, while the trial write is performed. When an asymmetry value detected from the reproduced signal coincides with the reference asymmetry value (=0) obtained from the odd-number-length data length sets, such an asymmetry value is identified. In this case, the leading edge position Tsfpe(opt)=1.05 of the first heating pulse and the leading edge position Tslpe(opt)=0.95T of the last heating pulse are obtained as optimum values.

In this manner, with respect to the data length sets having different rules regarding recording waveforms, a particular data length set is used as a reference value of a reproduced signal such as to conform to the disk characteristics and mark formation conditions. The pulse edge position and pulse width of recording waveforms for other data length sets are effectively selected, and the second trial write allows the optimum pulse edge position and pulse width to be computed.

As described above, the optimum recording power Pw(opt) is computed through the first trial write process, and the optimum pulse condition settings Tsfp(opt), Tfp(opt), Tslp(opt), Tlp(opt), Tecp(opt), and the like are computed through the second trial write process. With this, the trial write procedure comes to an end.

At the time of normal information recording, the optimum recording power and optimum pulse condition settings obtained in this manner may be used to perform recording, which allows all the data lengths to be formed with sufficient accuracy, thereby achieving precise recording.

When the optimum recording power is computed from the rate of change γ in the modulation factor m at step S3, the recording of a relatively short mark by use of a power different from the optimum power hardly affects the modulation factor m and the rate of change γ. In consideration of this, the first test patterns may be comprised of data patterns (normal data) having all the data lengths, or may be comprised of particular data patterns having relatively long marks (e.g., no shorter than 6T). The trial write may then be performed while changing the recording power Pw with respect to the test patterns including the data length sets serving as a predetermined reference (e.g., odd-number length).

In the description provided above, the record medium 1 has been described as a phase-change-type record medium. Even in the case of another recording medium such as a dye type or inorganic material type, the OPC method as described above can be properly applied in the recording method that performs recording according to the data length sets having different rules regarding recording waveforms.

The first and second test patterns may be formed as a continuous data pattern, so that the trial write for odd-number lengths and the trial write for even-number lengths may be performed continuously. After this, these two trial write areas are reproduced at once, and the reference asymmetry value derived from the odd-number-length data lengths and the optimum values of pulse edge position or pulse width of the recording waveform for the even-number-length data lengths may be computed. Namely, the processes may be performed in the order of steps S11, S12, S13, S14, S15, S17, S18, S16, and S19. With this provision, it is possible to omit the switching step (such as the time required to access the trial write area) between the recording and the reproducing, thereby reducing the trial write process time.

Figure 10:
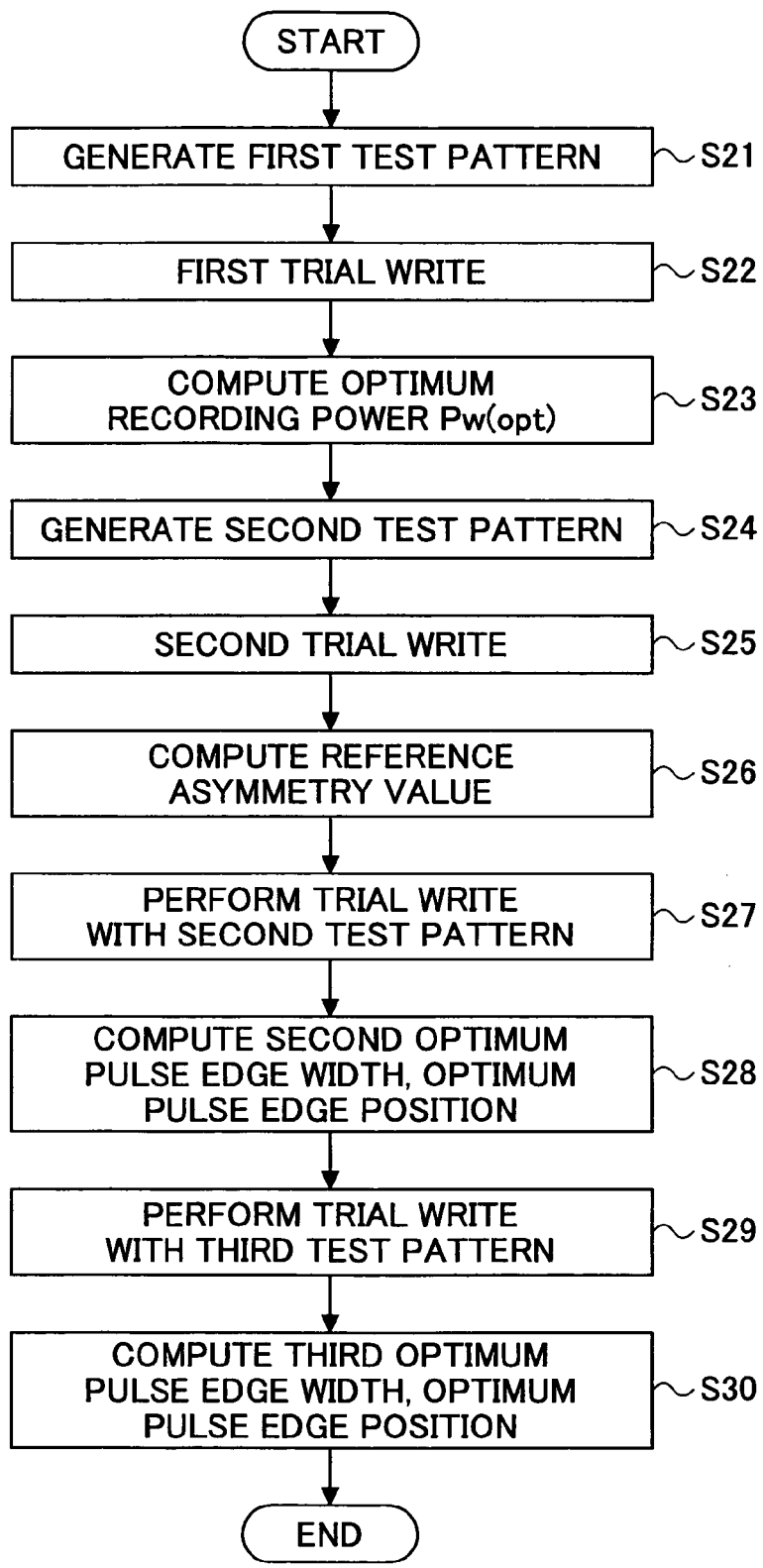
FIG. 10 is an outline flowchart showing an example of trial write process control according to another embodiment.

In the following, another embodiment of the information recording method will be described with reference to FIG. 10. This embodiment is directed to an example in which n=3. A description will be given of a method in which classification by the data length into three data length sets is made, and an optimum recording power and optimum recording waveform are computed with respect to each data length set. More specifically, the so-called 3T strategy, in which classification is made according to the remainders 0, 1, and 2 of the division of a data length by n=3, is used. This information recording method uses a recording waveform in which a pair of a heating pulse and a cooling pulse is added each time the data length increases by 3T. The first data length set has a data length (3, 6, 9T) having a remainder of 0, the second data length set with a data length (4, 7, 10T) having a remainder of 1, and the third data length set with a data length (5, 8, 11, 14T) having a remainder of 2. Further, the pulse edge position and pulse width of the recording waveforms use different rules in which suffixes 0, 1, and 2 are added as in Tsfp0, Tsfp1, and Tsfp2. As the recording pulse edge position or pulse width, the pulse edge position Tsfp(0, 1, 2) of the first heating pulse, the edge position Tslp(0, 1, 2) of the last heating pulse, the width Tlp(0, 1, 2) of the last heating pulse, the width Tecp(0, 1, 2) of the last cooling pulse, and so on are combined, and changed while performing trial write separately for each data length set, thereby computing each optimum value.

At step S21, a first test pattern is generated. This first test pattern is a random data pattern comprised of all the data lengths.

At step S22, the first test pattern is recorded in the trial write area while changing the recording power Pw on a sector-by-sector basis.

At step S23, the area in which the trial write is performed at step S22 is reproduced, and the power that is used to record the sector for which the reproduced signal Srf is most satisfactory is identified as the optimum recording power Pw(opt). In order to evaluate the quality of the reproduced signal, the method that uses a rate of change γ in the modulation factor may be employed as in the example previously described.

At step S24, a second test pattern is generated. This second test pattern is comprised of a test pattern including data lengths of the first data length set. Here, a preferable pattern is such that a ratio of generated data lengths is based on a ratio of data modulation.

At step S25, a test pattern comprised of data lengths of the first data length set including the shortest mark length in the next sector of the trial write area is recorded by use of the optimum recording power Pw(opt) computed at step S23. Here, a preferable pattern is such that a ratio of generated data lengths is based on a ratio of data modulation.

At step S26, the area in which the trial write is performed at step S25 is reproduced, and an average value and asymmetry value of the reproduced signal obtained from this sector are set aside as reference values. For evaluation of the quality of a reproduced signal, the example previously described may be employed.

At step S27, the pulse edge position or pulse width (e.g., one of or a combination of Tsfp1, Tslp1, Tslp1, and Tecp1) of recording waveform is changed for each next sector of the trial write area, while the test pattern comprised of the data lengths of the second data length set is recorded by using the optimum recording power Pw(opt) computed at step S23. Here, a preferable pattern is such that a ratio of generated data lengths is based on a ratio of data modulation.

At step S28, the area in which the trial write is performed at step S27 is reproduced, and the optimum recording pulse settings Tsfp1(opt), Tfp1(opt), Tslp1(opt), Tlp1(opt), and Tecp1(opt) are computed, which are the pulse edge position or pulse width that is used to record the sector for which the asymmetry β of the reproduced signal Srf of the second-data-length-set data lengths matches the asymmetry value of the first-data-length-set data lengths serving as a reference value. Alternatively, a formula approximating the pulse edge position or pulse width and the asymmetry β may be derived, based on which the recording power corresponding to β=reference asymmetry value may be computed. In this case also, the example previously described may be adopted in order to evaluate the quality of a reproduced signal.

At step S29, the pulse edge position or pulse width (e.g., one of or a combination of Tsfp2, Tslp2, Tslp2, and Tecp2) of recording waveform is changed for each next sector of the trial write area, while the test pattern comprised of the data lengths of the third data length set is recorded by using the optimum recording power Pw(opt) computed at step S23. Here, a preferable pattern is such that a ratio of generated data lengths is based on a ratio of data modulation.

At step S30, the area in which the trial write is performed at step S29 is reproduced, and the optimum recording pulse settings Tsfp2(opt), Tfp2(opt), Tslp2(opt), Tlp2(opt), and Tecp2(opt) are computed, which are the pulse edge position or pulse width that is used to record the sector for which the asymmetry β of the reproduced signal Srf of the third-data-length-set data lengths matches the asymmetry value of the first-data-length-set data lengths serving as a reference value. Alternatively, a formula approximating the pulse edge position or pulse width and the asymmetry β may be derived, based on which the recording power corresponding to β=reference asymmetry value may be computed. In this case also, the example previously described may be adopted in order to evaluate the quality of a reproduced signal.

As described above, the optimum recording power Pw(opt) and the optimum values of pulse edge position and pulse width for the second and third data length sets are computed. With this, the trial write procedure comes to an end.

At the time of normal information recording, the optimum recording power and optimum recording waveform obtained in this manner may be used to perform recording, which allows all the data lengths to be formed with sufficient accuracy, thereby achieving precise recording.

In the example described above, a test pattern for each data length set is such that a ratio of generated data lengths of a particular pattern for which the recording power is changed is based on a ratio of data modulation. Alternatively, patterns that are properly adjusted such as to make an error ignorable in asymmetry detection may be supplied from the controller as fixed data.

The invention claimed is:

1. An information recording method of recording information by forming recording marks by emitting light, from a light source on a record medium, modulated according to record information and rules by use of n (n: integer more than one) type data length sets which are classified by a data length of record information such that the rules of recording waveforms thereof are different, comprising:

a first trial write step of writing as a trial a predetermined first test pattern in a trial write area of the record medium while changing a recording power for emitting in a stepwise manner, so as to obtain an optimum recording power from a reproduced signal of recorded trial write data; and a second trial write step of performing trial write in the trial write area of the record medium by use of the optimum recording power by using a second test pattern corresponding to each of the data length sets while changing pulse width or pulse edge position of recording waveform for each of the data length sets in a stepwise manner, and obtaining an optimum pulse width or optimum pulse edge position of the recording waveform corresponding to each of the data length sets from a reproduced signal of each recorded second test pattern, wherein information is recorded based on the optimum recording power obtained in said first trial write step and the optimum pulse width or optimum pulse edge position obtained in the second trial write step; and wherein said first trial write step includes:

a first test pattern generating step of generating the first test pattern for performing trial write in the trial write area of the record medium; and an optimum recording power obtaining step of obtaining the optimum recording power from the reproduced signal of the recorded trial write data, and wherein said second trial write step includes:

a second test pattern generating step of generating the second test pattern corresponding to each of the data length sets for performing of trial write;

a trial write processing step of performing trial write in the trial write area of the record medium by using the optimum recording power and the second test pattern while maintaining fixed pulse width and fixed pulse edge position of recording waveform for one or more particular data length sets and while changing pulse width or pulse edge position of recording waveform for other data length sets in a stepwise manner; and an optimum recording waveform obtaining step of obtaining the optimum pulse width or optimum pulse edge position of recording waveform corresponding to the data length sets from the reproduced signal of the second test pattern corresponding to said other data length sets by using a reference asymmetry value derived from a reproduced signal of recorded trial write data corresponding to the second test pattern corresponding to said one or more particular data sets.

2. The information recording method as claimed in claim 1, wherein the first test pattern is a data series including all data lengths, and wherein the second test pattern has a predetermined data length, and is a data series that constitutes the n type data length sets.

3. The information recording method as claimed in claim 1, wherein the optimum recording power in said first trial write step is obtained such that a modulation factor, or a rate of change in the modulation factor, of the reproduced signal of the area in which trial write is performed in said step becomes a desired value, and wherein the optimum pulse width or optimum pulse edge position corresponding to each of said other data length sets in said second trial write step is obtained such that an asymmetry of the reproduced signal of the area in which trial write is performed in said step substantially coincides with a value of an asymmetry corresponding to said one or more particular data length sets.

4. The information recording method as claimed in claim 3, wherein the optimum pulse width or optimum pulse edge position corresponding to each of the data length sets in said second trial write step is obtained from an average value of the reproduced signal corresponding to each of the n type data length sets in the area in which trial write is performed in said step.

5. The information recording method as claimed in claim 1 or 3, wherein the integer n is 2, and a pair of a heating pulse and a cooling pulse is added for every 2T multi-pulses constituting the record waveform of each of the data length sets, and wherein the data length sets having odd-number-length data lengths with respect to a clock cycle T of the record information are used as said particular data length sets.

6. An information recording method of recording information by forming recording marks by emitting light, from a light source on a record medium, modulated according to record information and rules by use of n (n: integer more than one) type data length sets which are classified by a data length of record information such that the rules of recording waveforms thereof are different, comprising:

a first trial write step of writing as a trial a predetermined first test pattern in a trial write area of the record medium while changing a recording power for emitting in a stepwise manner, so as to obtain an optimum recording power from a reproduced signal of recorded trial write data; and a second trial write step of performing trial write in the trial write area of the record medium by use of the optimum recording power by using a second test pattern corresponding to each of the data length sets while changing pulse width or pulse edge position of recording waveform for each of the data length sets in a stepwise manner, and obtaining an optimum pulse width or optimum pulse edge position of the recording waveform corresponding to each of the data length sets from a reproduced signal of each recorded second test pattern, wherein information is recorded based on the optimum recording power obtained in said first trial write step and the optimum pulse width or optimum pulse edge position obtained in the second trial write step; and wherein the optimum recording power in said first trial write step is obtained from a modulation factor of the reproduced signal of the area in which trial write is performed in said step, or obtained from a rate of change in the modulation factor, and wherein the optimum pulse width or optimum pulse edge position corresponding to each of the data length sets in said second trial write step is obtained from an asymmetry that is a ratio of a positive-side peak value to a negative-side peak value relative to an average value level of the reproduced signal of the area in which trial write is performed in said step.

7. An information recording apparatus for recording information by forming recording marks by emitting light, from a light source on a record medium, modulated according to record information and rules by use of n (n: integer more than one) type data length sets which are classified by a data length of record information such that the rules of recording waveforms thereof are different, comprising:

a first trial write unit to write as a trial a predetermined first test pattern in a trial write area of the record medium while changing a recording power for emitting in a stepwise manner, so as to obtain an optimum recording power from a reproduced signal of recorded trial write data; and a second trial write unit to perform trial write in the trial write area of the record medium by use of the optimum recording power by using a second test pattern corresponding to each of the data length sets while changing pulse width or pulse edge position of recording waveform for each of the data length sets in a stepwise manner, and obtaining an optimum pulse width or optimum pulse edge position of the recording waveform corresponding to each of the data length sets from a reproduced signal of each recorded second test pattern, wherein information is recorded based on the optimum recording power obtained by said first trial write unit and the optimum pulse width or optimum pulse edge position obtained by the second trial write unit; and wherein said first trial write unit includes:

a first test pattern generating unit to generate the first test pattern for performing trial write in the trial write area of the record medium; and an optimum recording power obtaining unit to obtain the optimum recording power from the reproduced signal of the recorded trial write data, and wherein said second trial write unit includes:
a second test pattern generating unit to generate the second test pattern corresponding to each of the data length sets for performing of trial write;
a trial write processing unit to perform trial write in the trial write area of the record medium by using the optimum recording power and the second test pattern while maintaining fixed pulse width and fixed pulse edge position of recording waveform for one or more particular data length sets and while changing pulse width or pulse edge position of recording waveform for other data length sets in a stepwise manner; and
an optimum recording waveform obtaining unit to obtain the optimum pulse width or optimum pulse edge position of recording waveform corresponding to the data length sets from the reproduced signal of the second test pattern corresponding to said other data length sets by using a reference asymmetry value derived from a reproduced signal of recorded trial write data corresponding to the second test pattern corresponding to said one or more particular data sets.

8. The information recording apparatus as claimed in claim 7, wherein the first test pattern is a data series including all data lengths, and wherein the second test pattern has a predetermined data length, and is a data series that constitutes the n type data length sets.

9. The information recording apparatus as claimed in claim 7, wherein the optimum recording power in said first trial write unit is obtained such that a modulation factor, or a rate of change in the modulation factor, of the reproduced signal of the area in which trial write is performed in said unit becomes a desired value, and wherein the optimum pulse width or optimum pulse edge position corresponding to each of said other data length sets in said second trial write unit is obtained such that an asymmetry of the reproduced signal of the area in which trial write is performed in said unit substantially coincides with a value of an asymmetry corresponding to said one or more particular data length sets.

10. The information recording apparatus as claimed in claim 9, wherein the optimum pulse width or optimum pulse edge position corresponding to each of the data length sets in said second trial write unit is obtained from an average value of the reproduced signal corresponding to each of the n type data length sets in the area in which trial write is performed in said unit.

11. The information recording apparatus as claimed in claim 7 or 9, wherein the integer n is 2, and a pair of a heating pulse and a cooling pulse is added for every 2T multi-pulses constituting the record waveform of each of the data length sets, and wherein the data length sets having odd-number-length data lengths with respect to a clock cycle T of the record information are used as said particular data length sets.

12. An information recording apparatus for recording information by forming recording marks by emitting light, from a light source on a record medium, modulated according to record information and rules by use of n (n: integer more than one) type data length sets which are classified by a data length of record information such that the rules of recording waveforms thereof are different, comprising:
a first trial write unit to write as a trial a predetermined first test pattern in a trial write area of the record medium while changing a recording power for emitting in a stepwise manner, so as to obtain an optimum recording power from a reproduced signal of recorded trial write data; and
a second trial write unit to perform trial write in the trial write area of the record medium by use of the optimum recording power by using a second test pattern corresponding to each of the data length sets while changing pulse width or pulse edge position of recording waveform for each of the data length sets in a stepwise manner, and obtaining an optimum pulse width or optimum pulse edge position of the recording waveform corresponding to each of the data length sets from a reproduced signal of each recorded second test pattern,
wherein information is recorded based on the optimum recording power obtained by said first trial write unit and the optimum pulse width or optimum pulse edge position obtained by the second trial write unit; and
wherein the optimum recording power in said first trial write unit is obtained from a modulation factor of the reproduced signal of the area in which trial write is performed in said unit, or obtained from a rate of change in the modulation factor, and wherein the optimum pulse width or optimum pulse edge position corresponding to each of the data length sets in said second trial write unit is obtained from an asymmetry that is a ratio of a positive-side peak value to a negative-side peak value relative to an average value level of the reproduced signal of the area in which trial write is performed in said unit.

13. A record medium having an information recording program recorded therein for causing a controller to record information by forming recording marks by emitting light, from a light source on a record medium, modulated according to record information and rules by use of n (n: integer more than one) type data length sets which are classified by a data length of record information such that the rules of recording waveforms thereof are different, said information recording program causing said controller to perform:
a first trial write step of writing as a trial a predetermined first test pattern in a trial write area of the record medium while changing a recording power for emitting in a stepwise manner, so as to obtain an optimum recording power from a reproduced signal of recorded trial write data; and
a second trial write step of performing trial write in the trial write area of the record medium by use of the optimum recording power by using a second test pattern corresponding to each of the data length sets while changing pulse width or pulse edge position of recording waveform for each of the data length sets in a stepwise manner, and obtaining an optimum pulse width or optimum pulse edge position of the recording waveform corresponding to each of the data length sets from a reproduced signal of each recorded second test pattern,
wherein said controller is caused by said information recording program to record information based on the optimum recording power obtained in said first trial write step and the optimum pulse width or optimum pulse edge position obtained in the second trial write step; and
wherein said first trial write step of said information recording program causes said controller to perform:
a first test pattern generating step of generating the first test pattern for performing trial write in the trial write area of the record medium; and
an optimum recording power obtaining step of obtaining the optimum recording power from the reproduced signal of the recorded trial write data, and
wherein said second trial write step of said information recording program causes said controller to perform:
a second test pattern generating step of generating the second test pattern corresponding to each of the data length sets for performing of trial write;

a trial write processing step of performing trial write in the trial write area of the record medium by using the optimum recording power and the second test pattern while maintaining fixed pulse width and fixed pulse edge position of recording waveform for one or more particular data length sets and while changing pulse width or pulse edge position of recording waveform for other data length sets in a stepwise manner; and an optimum recording waveform obtaining step of obtaining the optimum pulse width or optimum pulse edge position of recording waveform corresponding to the data length sets from the reproduced signal of the second test pattern corresponding to said other data length sets by using a reference asymmetry value derived from a reproduced signal of recorded trial write data corresponding to the second test pattern corresponding to said one or more particular data sets.

* * * * *